(12) United States Patent
Akamatsu

(10) Patent No.: US 7,659,005 B2
(45) Date of Patent: Feb. 9, 2010

(54) HEAT-RESISTANT LABEL APPLICABLE AT HIGH TEMPERATURE

(75) Inventor: Yoshihiro Akamatsu, Yao (JP)

(73) Assignee: Yushi-Seihin Co., Ltd., Osaka (JP)

( * ) Notice: Subject to any disclaimer, the term of this patent is extended or adjusted under 35 U.S.C. 154(b) by 449 days.

(21) Appl. No.: 10/569,836

(22) PCT Filed: Aug. 24, 2004

(86) PCT No.: PCT/JP2004/012442

§ 371 (c)(1),
(2), (4) Date: Feb. 27, 2006

(87) PCT Pub. No.: WO2005/021673

PCT Pub. Date: Mar. 10, 2005

(65) Prior Publication Data

US 2007/0027241 A1    Feb. 1, 2007

Related U.S. Application Data

(60) Provisional application No. 60/498,867, filed on Aug. 28, 2003, provisional application No. 60/531,496, filed on Dec. 19, 2003.

(30) Foreign Application Priority Data

Apr. 30, 2004   (WO) ............... PCT/JP2004/006297

(51) Int. Cl.
*B32B 15/04* (2006.01)

(52) U.S. Cl. .................. 428/450; 524/588; 525/477

(58) Field of Classification Search ................. 524/588; 525/477; 428/450
See application file for complete search history.

(56) References Cited

U.S. PATENT DOCUMENTS

| 4,808,659 A | 2/1989 | Nishihara et al. |
| 4,929,507 A * | 5/1990 | Nishihara et al. ........... 428/447 |
| 5,506,016 A | 4/1996 | Onodera et al. |

FOREIGN PATENT DOCUMENTS

| EP | 0 217 129 A1 | 4/1987 |
| EP | 0 649 126 A1 | 4/1995 |
| JP | 64-042230 A | 2/1989 |
| JP | 02-173159 A | 7/1990 |
| JP | 07-002575 A | 1/1995 |
| JP | 11-335640 A | 12/1999 |
| JP | 2000-098899 A | 4/2000 |
| JP | 2003-126911 A | 5/2003 |
| JP | 2004-091703 A | 3/2004 |
| JP | 2004-099842 A | 4/2004 |

* cited by examiner

*Primary Examiner*—Kuo-Liang Peng
(74) *Attorney, Agent, or Firm*—Knobbe Martens Olson & Bear LLP

(57) ABSTRACT

The present invention relates to compositions for heat-resistant labels that are attachable under high-temperature conditions of 300° C. to 1100° C., heat-resistant labels, products with the labels attached, and methods for producing the labels. The invention employs, as a sticking layer of heat resistant labels, a hardened coating film including a silicone resin (A) and at least one member selected from the group consisting of a polymetallocarbosilane resin, zinc powder, tin powder, and aluminum powder (B), thereby providing heat resistant labels that can be attached at high temperature conditions.

22 Claims, No Drawings

HEAT-RESISTANT LABEL APPLICABLE AT HIGH TEMPERATURE

CROSS-REFERENCE TO RELATED APPLICATIONS

This application is the U.S. National Phase filing under 35 U.S.C. §371 of PCT/JP2004/012442, filed Aug. 24, 2004, which designated the United States, which claims priority to U.S. Provisional Patent Application Ser. Nos. 60/498,867, filed Aug. 28, 2003, and 60/531,496, filed Dec. 19, 2003; and to International Application No. PCT/JP2004/006297, filed Apr. 30, 2004. The entire contents of these applications are incorporated herein by reference.

TECHNICAL FIELD

The present invention relates to compositions for heat-resistant labels that are attachable to high-temperature products (300° C. or higher), heat-resistant labels, products with the labels attached, and methods for producing the labels.

BACKGROUND OF THE INVENTION

In various industrial fields, such as food, machinery and chemicals, a label on which symbols, letters, patterns, etc., have been printed, i.e., a patterned label, is attached to products or their packaging materials to control the production process. A typical example of such process control is a system utilizing labels on which a bar-code is printed. In a bar-code control system, data such as production conditions, production managers, production period, destination, and product price are read from the bar-code label by a bar-code reader to control production, sales, and distribution.

The bar-code labels that are currently in wide use are made by producing a resin or paper label having poor heat resistance, and then applying an adhesive made of acrylic resin or the like to it. However, because both the label and the adhesive decompose and evaporate at temperatures of 300° C. or higher, they cannot be used in industries requiring high-temperature processing, such as ceramics, metals, and the like. Japanese Patent No. 2614022 discloses heat-resistant labels but does not disclose attaching the labels at such high temperatures. Japanese Unexamined Patent Publication No. 2003-126911 discloses labels to be subjected to a heating process in which an aluminum coil is baked but discloses in Comparative Example 3 in the specification that the information on the label becomes unclear unless the attachment temperature is 150° C. or lower.

Therefore, in the metal mining industry, labels for product management are attached to metal products after the melted and formed metal is cooled to a temperature (generally, near room temperature) in the range in which the labels can be attached. The same applies to the ceramics and glass industries, and other industries requiring high-temperature processing.

DISCLOSURE OF THE INVENTION

However, labels that can be attached to high-temperature products allow product management to be started at an earlier stage in the production process.

Accordingly, an object of the present invention is to provide a heat-resistant label attachable to high-temperature products.

Another object of the invention is to provide a composition for a heat-resistant label to produce the heat resistant label.

Still another object of the invention is to provide an article to which the heat-resistant label has been attached.

The inventors carried out extensive research to achieve the above-mentioned objects in view of the problems of the prior art. As a result, they found that heat-resistant labels having as a sticking layer a hardened coating film made of a composition comprising a silicone resin (A); at least one member selected from the group consisting of a polymetallocarbosilane resin, zinc powder, tin powder, and aluminum powder (B); and a solvent (C) can be attached to high-temperature products of 300° C. or higher. The inventors further found that heat-resistant labels with an aluminum foil layer or tin foil layer on one side (adhering side) of a very high temperature-resistant support (e.g., stainless support, copper support) can be attached at temperatures of 670° C. to 1100° C., or 300° C. to 1100° C., respectively, and the present invention has been accomplished based on these findings.

The present invention thus relates to the following compositions, heat-resistant labels, products with heat-resistant labels attached, and methods for producing the products.

Item 1. A composition for a heat-resistant label comprising a silicone resin (A), at least one member selected from the group consisting of a polymetallocarbosilane resin, zinc powder, tin powder and aluminum powder (B), and a solvent (C).

Item 2. A composition for a heat-resistant label according to item 1 comprising a silicone resin (A), a polymetallocarbosilane resin (B-1), and a solvent (C).

Item 3. A composition for a heat-resistant label according to item 1 or 2, wherein the weight ratio of the silicone resin (A): the polymetallocarbosilane resin (B-1) is about 1:9 to about 9:1.

Item 4. A composition for a heat-resistant label according to any one of items 1 to 3, wherein the weight ratio of the silicone resin (A) the polymetallocarbosilane resin (B-1) is about 7:3 to about 2:8.

Item 5. A composition for a heat-resistant label according to any one of items 1 to 4, wherein the silicone resin (A) has a weight-average molecular weight of about 1000 to about 5000000.

Item 6. A composition for a heat-resistant label according to any one of items 1 to 5 further comprising an inorganic filler (D).

Item 7. A composition for a heat-resistant label according to item 1 comprising a silicone resin (A), at least one high-temperature-adhering inorganic powder selected from the group consisting of zinc powder, tin powder, and aluminum powder (B-2), and a solvent (C).

Item 8. A composition for a heat-resistant label according to item 1 or 7, wherein the weight ratio of the silicone resin (A): the at least one high-temperature-adhering inorganic powder selected from the group consisting of zinc powder, tin powder and aluminum powder (B-2) is about 1:5 to about 10:1.

Item 9. A composition for a heat-resistant label according to item 1 comprising a silicone resin (A), a polymetallocarbosilane resin (B-1), at least one high-temperature-adhering inorganic powder selected from the group consisting of zinc powder, tin powder, and aluminum powder (B-2), and a solvent (C).

Item 10. A composition for a heat-resistant label according to any one of items 1 to 6, and 9, wherein the polymetallocarbosilane resin (B-1) is at least one member selected from the group consisting of polytitanocarbosilane resins and polyzirconocarbosilane resins.

Item 11. A composition for a heat-resistant label according to any one of items 1 to 6, 9, and 10, wherein the polymetallocarbosilane resin (B-1) has a weight-average molecular weight of about 500 to about 10000.

Item 12. A heat-resistant label having a sticking layer on a sticking side of a support, the sticking layer comprising a hardened coating film comprising a silicone resin (A) and at least one member selected from the group consisting of a polymetallocarbosilane resin, zinc powder, tin powder, and aluminum powder (B).

Item 13. A heat-resistant label according to item 12, wherein the hardened coating film is obtained by applying to the support a composition of any one of items 1 to 11 and evaporating off the solvent contained in the composition.

Item 14. A heat-resistant label according to item 12, wherein the hardened coating film comprises a silicone resin (A) and a polymetallocarbosilane resin (B-1).

Item 15. A heat-resistant label according to item 12, wherein the hardened coating film comprises a silicone resin (A) and at least one high-temperature-adhering inorganic powder selected from the group consisting of zinc powder, tin powder, and aluminum powder (B-2).

Item 16. A heat-resistant label according to item 12, wherein the hardened coating film comprises a silicone resin (A), a polymetallocarbosilane resin (B-1), and at least one high-temperature-adhering inorganic powder selected from the group consisting of zinc powder, tin powder, and aluminum powder (B-2).

Item 17. A heat-resistant label according to any one of items 12 to 16, wherein the sticking layer has a thickness of about 5 μm to about 100 μm.

Item 18. A heat-resistant label according to any one of items 12 to 17, wherein the support has a thickness of about 5 μm to about 100 μm.

Item 19. A heat-resistant label according to any one of items 12 to 18, wherein the support is an aluminum foil, stainless steel foil, or copper foil.

Item 20. A heat-resistant label according to any one of items 12 to 19 having a heat-resistant label base layer on a display side of the support.

Item 21. A heat-resistant label according to item 20, wherein the label base layer is a cured coating film comprising a silicone resin (A) and a polymetallocarbosilane resin (B-1).

Item 22. A heat-resistant label according to item 20 or 21, wherein the label base layer is a cured coating film obtained by applying to the support a composition of any one of items 2 to 6 and heating the composition.

Item 23. A heat-resistant label according to any one of items 20 to 22, wherein the label base layer has a thickness of about 0.5 μm to about 100 μm.

Item 24. A heat-resistant label according to any one of items 20 to 23 having an identification part on the label base layer.

Item 25. An article to which a heat-resistant label of any one of items 12 to 24 is attached through a cured sticking layer.

Item 26. A method for producing a heat-resistant label, the method comprising the steps of: applying a composition of any one of items 1 to 11 to a sticking side of a support; and drying the applied composition to form a hardened coating film.

Item 27. A production method according to item 26, wherein the applied composition is dried at about 50° C. to about 240° C.

Item 28. A production method according to item 26 or 27, comprising, prior to the step of applying a composition of any one of items 1 to 11 to a sticking side of a support, the steps of: applying a composition for a heat-resistant label base layer to a display side of a support; and drying the applied composition to form a cured coating film.

Item 29. A production method according to item 28, wherein the composition for a label base layer is a composition of any one of items 2 to 6.

Item 30. A method for producing an article with a heat-resistant label attached, the method comprising the step of attaching a heat-resistant label of any one of items 12 to 24 to an article at about 300° C. to about 670° C.

Item 31. A heat-resistant label comprising a support and a metal foil layer comprising at least one member selected from the group consisting of an aluminum foil, aluminum-alloy foil, tin foil, and tin-alloy foil, the metal foil layer being laminated on a sticking side of the support.

Item 32. A heat-resistant label according to item 31, wherein the metal foil layer is laminated on the support through an adhering layer.

Item 33. A heat-resistant label according to item 31 or 32, wherein the metal foil layer has a thickness of 5 μm to 100 μm.

Item 34. A heat-resistant label according to any one of items 31 to 33, wherein the support is a stainless steel foil, copper foil, or iron foil.

Item 35. A heat-resistant label according to any one of items 31 to 34, comprising a heat-resistant label base layer on a display side of the support.

Item 36. A heat-resistant label according to item 35, wherein the label base layer has a thickness of about 0.5 μm to about 1.00 μm.

Item 37. A heat-resistant label according to item 35 or 36, wherein the label base layer is a cured coating film obtained by crosslinking the resins of a composition of any one of items 2 to 6.

Item 38. A heat-resistant label according to any one of items 35 to 37 comprising an identification part on the label base layer.

Item 39. An article to which a heat-resistant label of any one of items 31 to 37 is attached.

Item 40. A method for producing an article with a heat-resistant label attached, the method comprising the step of attaching a heat-resistant label of any one of items 31 to 39 to an article at about 670° C. to about 1100° C.

Compositions for heat-resistant labels of the present invention comprise a silicone resin (A); at least one member selected from the group consisting of a polymetallocarbosilane resin, zinc powder, tin powder, and aluminum powder (B); and a solvent (C).

The invention uses a composition in which at least one member selected from the group consisting of a polymetallocarbosilane resin, zinc powder, tin powder, and aluminum powder (B) and a solvent (C) are mixed with a silicone resin (A), thereby providing heat-resistant labels that can be immediately attached to high-temperature products.

In the invention, the silicone resin (A) has a polyorganosiloxane structure in its molecule. Examples of silicone resins include straight silicone resins, modified silicone resins, and silicone adhesives. Such silicone resins may be used in combination. Among the above, straight silicone resins are preferable as a silicone resin (A) to be combined with a polymetallocarbosilane resin (B-1). Conversely, silicone adhesives are preferable as a silicone resin (A) to be combined with at least one high-temperature-adhering inorganic powder selected from the group consisting of zinc powder, tin powder, aluminum powder, and magnesium powder (B-2) (hereinafter, may be referred to as "high-temperature-adhering inorganic powder (B-2)").

In order to facilitate the process of applying the resin to a support during the preparation of the label, the resin is preferably used in the form of a solvent solution.

The weight-average molecular weight of the silicone resin (A) is generally about 1000 to about 5000000, and preferably about 3000 to about 1000000.

A straight silicone resin includes an organopolysiloxane comprising a hydrocarbon group as a main organic group. The organopolysiloxane may contain a hydroxyl group. Examples of the foregoing hydrocarbon groups include aliphatic hydrocarbon groups and aromatic hydrocarbon groups. Preferred among the above are $C_{1-5}$ aliphatic hydrocarbon groups and $C_{6-12}$ aromatic hydrocarbon groups. Such hydrocarbon groups may be used singly or in combination.

Examples of the $C_{1-5}$ aliphatic hydrocarbon groups include methyl, ethyl, propyl, butyl, pentyl, vinyl, allyl, propenyl, butenyl, and pentenyl groups. Examples of the $C_{6-12}$ aromatic hydrocarbon groups include phenyl, methylphenyl, ethylphenyl, butylphenyl, tertiary butylphenyl, naphthyl, styryl, allylphenyl, and propenylphenyl groups.

The straight silicone resin may be obtained by hydrolyzing one or more silane compounds such as a chlorosilane or alkoxysilane comprising the foregoing aliphatic hydrocarbon group or aromatic hydrocarbon group, and then condensing the hydrolysis products, or by hydrolyzing a mixture of the foregoing silane compound with tetrachlorosilane or tetraalkoxysilane, and then co-condensing the hydrolysis product.

Examples of the foregoing chlorosilane compounds include methyltrichlorosilane, dimethyldichlorosilane, trimethylchlorosilane, methylethyldichlorosilane, vinylmethyldichlorosilane, vinyltrichlorosilane, phenyltrichlorosilane, diphenyldichlorosilane, methylphenyldichlorosilane, vinylphenyldichlorosilane, etc.

Examples of the foregoing alkoxysilane compounds include methyltrimethoxysilane, dimethyldimethoxysilane, dimethyldiethoxysilane, trimethylmethoxysilane, vinylmethylmethoxysilane, vinyltributoxysilane, phenyltriethoxysilane, diphenyldimethoxysilane, methylphenyldipropoxysilane, vinylphenyldimethoxysilane, etc.

The modified silicone resin is an organopolysiloxane containing an organic group other than a hydrocarbon group. Examples of the modified silicone resin include methoxy-containing silicone resins, ethoxy-containing silicone resins, epoxy-containing silicone resins, alkyd resin-modified silicone resins, acrylic resin-modified silicone resins, polyester resin-modified silicone resins, epoxy resin-modified silicone resins, etc.

These modified silicone resins can be obtained by, for example, reacting the hydroxyl group of the foregoing straight silicone resin with an organic compound having a functional group reactive to the hydroxyl group, such as carboxyl, acid anhydride, hydroxyl, aldehyde, epoxy, and chloride groups; by copolymerizing a straight silicone resin containing an unsaturated hydrocarbon group, such as a vinyl group, with a compound having an unsaturated double bond; by hydrolyzing a modified silane compound obtained by the reaction of the foregoing silane compound with another organic compound so that it undergoes condensation or co-condensation, or the like. The organic compound to be reacted may be a low molecular weight compound or a high molecular weight compound such as a resin.

Any silicone adhesive can be used without limitation. For example, silicone adhesives comprising a straight chain polyorganosiloxane with a main chain RSiO unit (D unit); a three-dimensional polyorganosiloxane with $R_3SiO_{0.5}$ unit (M unit) and $SiO_2$ unit (Q unit); and a hardener are mentioned. As a hardener, benzoylperoxide, etc., maybe used. Moreover, addition reaction-curing type silicone adhesives using a platinum catalyst comprise a straight chain polyorganosiloxane with a main chain $R_2SiO$ unit having a vinyl group; a three-dimensional polyorganosiloxane with $R_3SiO_{0.5}$ unit and $SiO_2$ unit; polyorganohydroxysiloxane; a reaction control agent, etc. and a curing catalyst such as a platinum compound. R is a monovalent organic group.

Since silicone adhesives have a sticking ability even at 0° C., the composition of the invention containing such a silicone adhesive as a component (A) also exhibits a sticking ability even at about 0° C. Therefore, labels with a hardened coating film made of the composition as a sticking layer can be attached to an attachment target even at temperatures of about 0° C. to about 300° C., in addition to high-temperature conditions. Thus, when a hardened coating film comprising a silicone adhesive is employed as a sticking layer, the sticking layer sticks to the target even at room temperature. In view of this, laminating a release film to the sticking layer can prevent labels from sticking to objects other than the attachment target during periods of non-use, and thus this is preferable.

Examples of the silicone resin (A) include dimethylpolysiloxane, methylphenylpolysiloxane, polydimethylsiloxane, polydimethyldiphenylsiloxane, diphenylmethylphenylsilicone resins, etc.

The polymetallocarbosilane resin (B-1) has a crosslinked structure obtained by, for example, reacting polycarbosilane with metal alkoxide. Examples of the above-mentioned metal include titanium, zirconium, molybdenum, chromium, etc., and among these titanium and zirconium are preferable. Preferred examples of the polymetallocarbosilane resin are polytitanocarbosilane resins, polyzirconocarbosilane resins, etc. In order to improve its coating property, the polymetallocarbosilane resin is preferably mixed with a solvent, such as toluene, xylene, etc. As a mixture comprising the polytitanocarbosilane resin, for example, a "Tyranno coat VS-100", "Tyranno coat VN-100", etc. manufactured by Ube Industries, Ltd., can be used. The weight-average molecular weight of the polymetallocarbosilane resin is preferably about 500 to about 10000, and more preferably about 700 to about 3000.

In the composition of the invention, there is no limitation to the proportion of the polymetallocarbosilane resin (B-1). The weight ratio of the silicone resin (A):the polymetallocarbosilane resin (B-1) is preferably about 1:9 to about 9:1, and more preferably about 7:3 to about 2:8. The composition obtained by mixing these two resins within such a range is favorable for label attachment under high temperature conditions.

The shape of the at least one high-temperature-adhering inorganic powder selected from the group consisting of zinc powder, tin powder, and aluminum powder powder (B-2) is not limited to a spherical shape, fibrous shapes, laminar shapes, etc. Accordingly, single-crystal inorganic fibers with relatively high aspect ratio such as whiskers are encompassed by the high-temperature-adhering inorganic powder (B-2). The mean particle diameter of the high-temperature-adhering inorganic powder (B-2) is usually 0.05 μm to 100 μm, preferably 1.0 μm to 10 μm, and more preferably 1 μm to 5μm.

The proportion of the high-temperature-adhering inorganic powder (B-2) is not limited, and is usually 10 parts by weight to 500 parts by weight, preferably 150 parts by weight to 400 parts by weight, and more preferably 200 parts by weight to 350 parts by weight, per 100 parts by weight of resin component (s). In view of this, when the silicone resin (A) alone is contained as a resin component in the composition of the invention, the proportion of the high-temperature-adhering inorganic powder (B-2) is within such a range based on 100 parts by weight of the silicone resin (A) alone. When the silicon resin (A) and the polymetallocarbosilane resin (B-1) are contained in the composition, the proportion of the high-temperature-adhering inorganic powder (B-2) is within such a range based on 100 parts by weight of the total amount of the silicon resin (A) and the polymetallocarbosilane resin (B-1).

In the invention, the solvent (C) has a function of dissolving or dispersing components in the composition to adjust the viscosity thereof. Usable as the solvent (C) are, for example, toluene, xylene, cellosolve acetate, ethyl acetate, butyl carbitol, MEK (methyl ethyl ketone), MIBK (methyl isobutyl ketone), etc. Among these, xylene and toluene are preferable. The proportion of the solvent (C) is not limited insofar as a heat-resistant label can be produced using the composition of the invention. Thus, the proportion of the solvent (C) can be appropriately adjusted in such a manner that the viscosity of the composition of the invention is suitable for application to the support and drying.

The proportion of the solvent (C) is not limited, and is usually 40 parts by weight to 900 parts by weight, preferably 200 parts by weight to 400 parts by weight, and more preferably 230 parts by weight to 350 parts by weight, per 100 parts by weight of resin component(s). In view of this, when the silicone resin (A) alone is contained as a resin component in the composition of the invention, the proportion of the solvent (C) is within such a range, based on 100 parts by weight of the silicone-resin (A) alone. When the silicon resin (A) and the polymetallocarbosilane resin (B-1) are contained in the composition, the proportion of the solvent (C) is within such a range, based on 100 parts by weight of the total amount of the silicon resin (A) and the polymetallocarbosilane resin (B-1).

An inorganic filler (D) can be added, if required, to the composition of the invention. The heat-resistance of the heat-resistant label can be enhanced by mixing an inorganic filler (D) since thermal expansion and shrinkage of the heat-resistant label can be thereby reduced. Thus, an inorganic filler (D) is preferably mixed with the composition of the invention which comprises a polymetallocarbosilane resin and which is used as a label base layer. In order to increase the contrast with an identification part, white inorganic fillers (D) are especially preferable. The label base layer can be colored by using a color pigment as the inorganic filler (D). Such inorganic fillers (D) can be used singly or in combination. The particle diameter of the inorganic fillers (D) is preferably about 0.01 µm to 200 µm, and more preferably about 0.1 µm to about 100 µm. The inorganic filler (D) is not limited in shape, and, for example, a spherical shape, fibrous shapes, laminar shapes, etc. are mentioned. Single-crystal inorganic fibers of high aspect ratio, such as potassium-titanate whiskers, can be mentioned as an example of the inorganic filler (D).

The proportion of the inorganic filler (D) is not limited, and is usually 10 parts by weight to 500 parts by weight, preferably 150 parts by weight to 400 parts by weight, and more preferably 200 parts by weight to 350 parts by weight, per 100 parts by weight of resin component(s). In view of this, when the silicone resin (A) alone is contained as a resin component in the composition of the invention, the proportion of the inorganic filler (D) is within such a range, based on 100 parts by weight of the silicone resin (A) alone. When the silicon resin (A) and the polymetallocarbosilane resin (B-1) are contained in the composition of the invention, the proportion of the inorganic filler (D) is within such a range, based on 100 parts by weight of the total amount of the silicon resin (A) and the polymetallocarbosilane resin (B-1). Alternatively, when the high-temperature-adhering inorganic powder (B-2) is contained in the composition of the invention, the proportion of the inorganic filler (D) is determined in such a manner that the total amount of the high-temperature-adhering inorganic powder (B-2) and the inorganic filler (D) is within such a range. When the inorganic filler (D) is combined with (B-2), the weight ratio of the inorganic filler (D) and the high-temperature-adhering inorganic powder (B-2) is preferably 0.05:1 to 1:1, and more preferably 0.1:1 to 1:1.

An inorganic pigment is used preferably as the inorganic filler (D). For example, usable are white substances, such as silica, titanium dioxide, alumina, zirconia, mica, calcium oxide, zinc sulfide-barium sulfate (lithopone), talc, clay, kaolin, calcium carbonate, etc. Moreover, usable are metal compounds, such as carbonates, nitrates, sulfates, etc., which are oxidized to form such white substances in a heat treatment during the production of the heat-resistant label. Also, usable as the inorganic powder (D) are reddish-brown substances containing metal ion such as iron, copper, gold, chromium, selenium, zinc, manganese, aluminum, tin, etc. (e.g., zinc oxide-iron oxide-chromium oxide, manganese oxide-alumina oxide, chromium oxide-tin oxide-iron oxide, etc.); blue substances containing metal ion such as manganese, chromium, aluminum, cobalt, copper, iron, zirconia, vanadium, etc. (e.g., cobalt oxide-aluminum oxide, cobalt oxide-aluminum oxide-chromium oxide, cobalt oxide, zirconia-vanadium oxide, chromium oxide-divanadium pentoxide, etc.); black substances containing metal ion such as iron, copper, manganese, chromium, cobalt, aluminum, etc. (e.g., copper oxide-chromium oxide-manganese oxide, chromium oxide-manganese oxide-iron oxide, chromium oxide-cobalt oxide-iron oxide-manganese oxide, chromate, permanganate, etc.); yellow substances containing metal ion such as vanadium, zinc, tin, zirconium, chromium, titanium, antimony, nickel, praseodymium, etc. (e.g., titanium oxide-antimony oxide-nickel oxide, titanium oxide-antimony oxide-chromium oxide, zinc oxide-iron oxide, zirconium-silicon-praseodymium, vanadium-tin, chromium-titanium-antimony, etc.); green substances containing metal ion such as chromium, aluminum, cobalt, calcium, nickel, zinc, etc. (e.g., titanium oxide-zinc oxide-cobalt oxide-nickel oxide, cobalt oxide-aluminum oxide-chromium oxide-titanium oxide, chromium oxide, cobalt-chromium, alumina-chromium, etc.); pink substances containing metal ion such as iron, silicon, zirconium, aluminum, manganese, etc. (e.g., aluminum-manganese, iron-silicon-zirconium, etc.). Among these, preferable are talc, clay, kaolin, titanium dioxide, alumina, zinc oxide-iron oxide-chromium oxide, titanium oxide-antimony oxide-nickel oxide, titanium oxide-antimony oxide-chromium oxide, zinc oxide, iron oxide, zinc oxide-iron oxide-chromium oxide, titanium oxide-zinc oxide-cobalt oxide-nickel oxide, cobalt oxide-aluminum oxide-chromium oxide, cobalt oxide-aluminum oxide, cobalt oxide-aluminum oxide-chromium oxide, copper oxide-chromium oxide-molybdenum oxide, copper oxide-chromium oxide-manganese oxide, copper oxide-manganese oxide-iron oxide. A label produced using kaolin is especially preferable since an identification part to be printed on the label base layer is not easily peeled off even when the label contacts fibers of the head of a label attaching machine at the time of attachment.

A dispersant (E) is preferably mixed into the composition for heat-resistant labels of the invention. This is because the dispersion rate is improved by mixing a dispersant, thereby facilitating preparation of the composition. Usable as the dispersant (E) are aliphatic polyvalent carboxylic acids, amine salts of polyester acids, long-chain amine salts of polycarboxylic acids, amine salts of polyether ester acids, amine salts of polyether phosphates, polyether phosphates, amide amine salts of polyester acids, etc. The dispersant (E) is generally used in a proportion of about 0.01 parts by weight to about 5 parts by weight, preferably about 0.1 parts by weight to about 2 parts by weight, per 100 parts by weight of the high-temperature-adhering inorganic powder (B-2) and inorganic filler (D). In view of this, when either one of the high-temperature-adhering inorganic powder (B-2) or inorganic filler (D) is contained in the composition of the invention, the proportion of the dispersant (E) is within such a range based on 100 parts by weight of total amount of the above. When both the high-temperature-adhering inorganic powder (B-2) and inorganic filler (D) are contained in the composition of the invention, the proportion of the dispersant (E) is within such a range, based on the total amount of the high-temperature-adhering inorganic powder (B-2) and inorganic filler (D).

Additives, such as crosslinking agents, plasticizers, etc., can also be added as needed to the composition for heat-resistant labels of the invention within ranges that do not adversely affect the effects of the invention, in addition to the silicone resin (A), at least one member selected from the group consisting of the polymetallocarbosilane resin, zinc powder, tin powder, and aluminum powder (B), the solvent (C), the inorganic filler (D), and the dispersant (E).

Examples of crosslinking agents include boric acid compounds, organometallic compounds, etc. Boric acid compounds are compounds containing a boric acid residue in its molecule, and include boric acids, borates, borate esters, etc. Boric acids include orthoboric acid, metaboric acid, anhydrous boric acid, etc. Borates include sodium borate, potassium borate, magnesium borate, calcium borate, zinc borate, aluminum borate, etc. Borate esters include methyl borate, ethyl borate, butyl borate, octyl borate, dodecyl borate, etc. Among such compounds, orthoboric acid is particularly preferable.

Examples of organometallic compounds include organonickel compounds, organoiron compounds, organocobalt compounds, organomanganese compounds, organotin compounds, organolead compounds, organozinc compounds, organoalumminum compounds, organotitanium compounds, etc., and among these, chelate compounds are preferable. Crosslinking agents are preferably mixed in an amount such that the amount of metal contained in the crosslinking agent is about 0.05 parts by weight to about 10 parts by weight, preferably about 0.1 parts by weight to about 5 parts by weight, per 100 parts by weight of the total amount of the resin (A) and the resin (B).

Examples of plasticizers include aliphatic esters, aromatic esters, phosphate esters, etc. Specific examples of aliphatic esters include methyl laurate, butyl oleate, diethylene glycol dilaurate, di(2-ethylbuthoxyethyl)adipate, etc. Specific examples of aromatic esters include dimethyl phthalate, dioctyl phthalate, di (2-ethylhexyl)phthalate, dilauryl phthalate, oleyl benzoate, phenyl oleate, etc. Specific examples of phosphate esters include tricresyl phosphate, trioctyl phosphate, etc. The addition of such plasticizers can provide a further improvement in the flexibility of the label base layer.

The composition of the invention can be prepared by mixing and dispersing the above-mentioned components. The components can be dispersed by a dispersion mill, such as a bead mill, a ball mill, a sand mill, a roll mill, etc. The grain size of the dispersion in the distributor is preferably about 0.01 to about 200 µm, more preferably about 0.1 to about 20 µm.

The composition of the invention can be used as a starting material for the sticking layer of the heat resistant label of the invention which is suitable for use at temperatures of 300° C. or higher. More specifically, the sticking layer is formed by applying the composition of the invention to one side (sticking side) of a support, and drying the applied composition until the solvent in the composition is removed so as to form a hardened coating film. The composition of the invention comprising the silicone resin (A) and the polymetallocarbosilane resin (B-1) can also be used as a starting material for forming the label base layer of the heat-resistant label of the invention. More specifically, the label base layer is formed by applying the composition of the invention to one side of the support, and drying the applied composition at a temperature at which the resins in the composition are crosslinked in such a manner as to form a cured coating film.

In this specification, a hardened coating film represents a film which is obtained by drying the composition of the invention until the solvent in the composition is substantially removed, and which can function as a sticking layer at temperatures of 300° C. or higher. In other words, the hardened coating film has a sticking ability at temperatures of 300° C. or higher (i.e., high-temperature sticking coating film). Crosslinking of the resins may proceed in such a manner that functionality as the sticking layer is demonstrated. Any remaining solvent might raise the possibility of ignition under high temperature conditions. Therefore, the amount of solvent remaining in the hardened coating film is usually about 0.1% by weight or less, preferably 0.0001% by weight or less. Crosslinking of the resins in the composition may occur in the drying process for removing the solvent. In the case of excessive crosslinking thereof, the film is cured, and thus the sticking ability is lost under high temperature conditions. Therefore, it is important to conduct the drying process under the drying conditions for forming the hardened coating film where the solvent is remove and the sticking function is maintained even under high temperature conditions, even if crosslinking proceeds.

The cured coating film of the composition of the invention comprising the polymetallocarbosilane resin (B-1) is useful for the label base layer of the heat-resistant label. For example, it can be used as a label base layer of the following heat-resistant label of the invention. A label is known whose support, such as a stainless steel foil or the like, is attached to a target by welding (spot welding, etc.); however the above-mentioned cured coating film can also be used as a label base layer that is attached by welding.

In this specification, a cured coating film represents a film which is obtained by drying the composition of the invention until the solvent in the composition is substantially removed and the film is cured to an extent that the film does not adhere to a label attaching machine and, if it is used-as a label base layer with an identification part, the identification part is kept, at temperatures of 300° C. or higher in the attachment process. In other words, the cured coating film does not stick at temperatures of 300° C. or higher (i.e., a high-temperature non-sticking coating film). In order to avoid the film from sticking to the label attaching machine, the film needs to be cured. Thus, the heating conditions for forming the cured coating film needs to be more severe than those for the hardened coating film.

High-temperature-adhering metal powder (tin, zinc, aluminum) may demonstrate a sticking ability under high-temperatures, and thus it is preferable that such metal powders are not mixed with a label base layer.

The heat-resistant label of the invention is suitable for attachment to a target having temperatures of about 300° C. or higher (preferably, 350° C. or higher, and more preferably 400° C. or higher) at the timing of attachment. Further, the heat-resistant label of the invention has a feature of providing, on a sticking side of the support, a sticking layer comprised of the hardened coating film comprising the silicone resin (A), and at least one member selected from the group consisting of the polymetallocarbosilane resin, zinc powder, tin powder, and aluminum powder (B). The heat-resistant labels of the invention are roughly classified into heat-resistant labels which are suitable for high temperature targets (about 300° C. to about 670° C.), and those suitable for very high temperature targets (about 670° C. to about 1100° C., hereinafter, these may be referred to as "super heat-resistant labels"). In this specification, the former is sometimes referred to as "heat-resistant label 1" and the latter as "heat-resistant label 2".

The heat-resistant label 1-1 of the invention has a feature of having a sticking layer, which is made of a hardened coating film comprising the silicone resin (A) and polymetallocarbosilane resin (B-1), on one side (sticking side) of the support. Such a label has, as a sticking layer, a hardened coating film obtained by applying the above-mentioned composition of the invention comprising, for example, the silicone resin (A) and polymetallocarbosilane resin (B-1) to a sticking side of the support, and drying the solvent of the applied composition. The sticking layer of the heat-resistant label 1-1 may comprise at least one member selected from the group consisting of zinc powder, tin powder, and aluminum powder, and further comprise an inorganic filler.

The heat-resistant label 1-2 of the invention has a feature such that a sticking layer, which is made of a hardened coating film comprising the silicone resin (A) and at least one high-temperature-adhering inorganic powder selected from the group consisting of zinc powder, tin powder, and aluminum powder (B-2) is placed on a sticking side of the support. Such a label is provided as a sticking layer with a hardened coating film obtained by applying the above-mentioned composition of the invention comprising, for example, the silicone resin (A) and high-temperature-adhering inorganic powder (B-2) to a sticking side of the support, and drying the solvent of the applied composition.

The heat-resistant labels 1-1 and 1-2 can be provided with a heat-resistant label base layer on the other side (display side) of the support, on which no sticking layer is provided. When a label base layer is not provided, an identification part, such as a bar code or the like, can be provided directly onto the support.

The support of the heat-resistant label 1 of the invention is made of a film-like and-heat-resistant material, and a metal foil is preferable. Minute pores maybe formed in the support. Forming pores makes it easy to evacuate gas produced when resins contained in the sticking layer and label base layer laminated on the support decompose at high temperatures, thereby suppressing expansion of the label base layer. A support made of the same material as the label attaching target gives the label a comparatively high resistance against thermal expansion and shrinkage, and thus the label is prevented from peeling off under high temperature conditions. Examples of metal foils include aluminum foil, stainless steel foil, copper foil, iron foil, etc. Among these, the aluminum foil is preferably used as the support. The thickness of the support is usually about 5 to about 100 µm, preferably about 10 to about 70 µm, and more preferably about 10 µm to about 60 µm. When the thickness of the support is within such a range, breakage of the label is suppressed due to further reduced thermal expansion or thermal contraction, and furthermore, due to the flexibility, the label can be attached in accordance with the shape of the target.

Examples of aluminum foils include JIS (Japanese Industrial Standard) alloys 1N30, 1085, 1N90, 1N99, 3003, 3004, 5052, 8079, and 8021, etc., with 1N30 being preferable.

Examples of stainless steel foils include martensite-based (SUS410, SUS440), ferrite-based (SUS430, SUS444), austenite-based (SUS304, SUS316), two-sided based (SUS329J1, SUS329J4L) foils, SUS630, and SUS631, etc.

JIS SPHC, SPCC, SECC, SGCC, SZACC, SA1C, etc. can be used as other metals, and among these, SPHC and SPCC Standard are preferable.

Easily available commercial metal foils can be used as the above-described supports.

In the heat-resistant label 1 of the invention, the sticking layer is the above-described hardened coating film. More specifically, such a film is obtained by drying the composition of the invention until the solvent in the composition is at least substantially removed, and serves as a sticking layer without the possibility of ignition under high temperature conditions of 300° C. or higher.

The temperature and period for drying the composition of the invention to form the sticking layer are not limited insofar as the composition of the invention is dried and the resultant end product serves as a sticking layer under high temperature conditions. Thus, the temperature and period are appropriately changed according to the thickness and the solvent content of the coating film obtained by applying the composition of the invention, and material and the thickness of the support. For example, drying may be carried out with a convection oven at about 50 to about 240° C., preferably at about 80 to about 200° C., for about 1 minute to about 60 minutes, and preferably about 1 minute to about 20 minutes. The drying period can be suitably adjusted according to the flow of hot air.

The thickness of the sticking layer after drying is usually about 5 µm to about 100 µm, preferably about 10 µm to about 60 µm. When the dry film thickness of the sticking layer is within such a range, the sticking layer is strongly stuck to the target, thereby inhibiting cohesion failure of the sticking layer.

The heat-resistant label 1 of the invention has a sticking layer on a sticking side of the support-, and a heat-resistant label base layer can be formed on the other side (display side) of the support. Any conventionally used or reported films obtained by drying compositions for the formation of the label base, such as a composition comprising, for example, a silicone resin, inorganic powder, and organic solvent, can be used as the label base layer insofar as it can withstand temperatures of 300° C. or higher. A cured coating film obtained by heating the composition of the invention can also be used as the label base layer. The label base layer can be formed by applying the composition of the invention to the display side of the support and heating the applied composition until the solvent of the composition is substantially removed and the resins in the composition are crosslinked, so as to form a cured coating film.

When the composition of the invention is used for forming the label base layer, the temperature and period for heating the composition of the invention are not limited insofar as the composition of the invention is dried and the resultant end product serves as the label base layer under high temperature conditions. Thus, the heating temperature and period are appropriately varied according to the thickness and solvent content of the coating film obtained by applying the composition of the invention to the support, and the material and thickness of the support. For example, heating may be carried out with a convection oven at about 245 to about 500° C., preferably at about 250 to about 400° C. for about 1 minute to about 40 minutes, preferably about 2 minutes to about 20 minutes. The drying period can be suitably adjusted according to the flow of hot air. The thickness of the label base layer after heating is generally about 0.5 µm to about 100 µm, and preferably about 1 µm to about 60 µm.

To produce the heat-resistant label 1 with the label base layer obtained by curing the composition of the invention, the label base layer is first formed on the display side of the support, and subsequently the sticking layer is formed on the sticking side of the support. When the label base layer is formed after the sticking layer, both the layers are made into a cured coating film due to the severer heating conditions for forming the label base layer than those for forming the sticking layer. In such a case, the heat-resistant label cannot be attached under high temperature conditions. When the label base layer is formed using the conventional composition for forming the label base, the order of forming the layers can be suitably determined considering the drying conditions applied to this composition and the sticking layer.

The method for manufacturing the heat-resistant label 1 of the invention comprises: applying the composition of the invention to one side of the support; and drying the applied composition to form a hardened coating film.

The composition of the invention is applied to a sticking side or display side of the support by, for example, a printing method such as screen-printing, etc., a roll coater method, gravure roll coater method, doctor blade method, bar coater method, etc. Screen-printing, gravure roll coating, and bar coating methods are preferable as application methods. The composition of the invention is applied to the support, and dried to form a hardened coating film (sticking layer). The drying conditions are the same as those for the sticking layer.

The method for producing the heat-resistant label 1 with the label base layer of a cured coating film obtained by curing the composition of the invention comprises, prior to applying the composition of the invention to the sticking side of the support in the above-mentioned production method: applying the composition for the heat-resistant label base layer to the display side of the support; and heating the applied composition to form a cured coating film.

When the composition of the invention is used as a composition for a heat-resistant label base layer, the step of applying the composition for the heat-resistant label base layer may be carried out in the same manner as the above-described step of applying the composition of the invention. The step of curing the composition of the invention by heating is curried out under the same conditions as the above-described conditions for forming the label base layer.

A conventional composition for a label base layer may be used as the composition for the heat-resistant label base formation. In this case also, the conventional composition can be applied in the same manner as the above-described step of applying the composition of the invention to the display side of the support. In the curing step, the heating conditions can be suitably varied according to the composition used.

The heat-resistant label 2 of the invention has a support and a metal foil layer, and the metal foil layer is made of at least one metal foil selected from the group consisting of an aluminum foil, an aluminum alloy foil, a tin foil, and a tin alloy foil (hereinafter, may be referred to as "adhering metal foil") on one side (adhering side) of the support, and is suitable for the use at about 670° C. to about 1100° C., and preferably about 700° C. to about 1000° C. With tin foil or tin alloy foil, the heat-resistant label 2 can be used at about 300° C. to about 670° C. in addition to the above range of about 670° C. to about 1100° C. An adhering layer for adhering the adhering metal foil layer to the support may be provided between the support and the adhering metal foil layer. The heat-resistant label 2 is stuck to the attachment target when the adhering metal foil is melted under high temperature conditions. A label having an aluminum layer that is formed by thermally spraying aluminum onto the support surface does not stick to the target, since the aluminum layer does not melt at the temperature of the attachment target. This is because the melting temperature of the layer obtained by thermal spraying is elevated by oxidization of the surface, whose area is increased by thermal spraying.

A film-like material which does not melt within the temperature range desirable for the label is usable for the support of the heat-resistant label 2, and a metal foil is preferable. A support made of the same material as the label attaching target gives the label further improved resistance against thermal expansion and shrinkage. Examples of metal foils include stainless steel foil, copper foil, iron foil, etc. Among these, stainless steel foil is preferable. The thickness of the support is usually about 5 µm to about 100 µm, preferably about 10 µm to about 50 µm, and more preferably about 10 µm to about 40 µm. When the thickness of the support is within such a range, breakage of the label is sufficiently suppressed due to further reduced thermal expansion or thermal shrinkage, and furthermore, due to the flexibility, the label can be attached in accordance with the shape of the target. Examples of stainless steel foils are the same as in the support of the heat-resistant label 1. The same applies to the other metal foils.

The heat-resistant label 2 can be attached when the adhering metal foil layer is melted at high temperatures. Accordingly, the adhering metal foil layer is formed on to only one side of the support. The thickness of the adhering metal foil layer is usually about 1 µm to about 300 µm, preferably about 10 µm to about 100 µm. An aluminum foil layer is preferable as the adhering metal foil layer. Examples of aluminum foils include, JIS alloys 1N30, 1085, 1N90, 1N99, 3003, 3004, 5052, 8079, and 8021, etc., and among these, 1N30 is preferable. In aluminum-alloy foil, the proportion of aluminum in the alloy is usually 50% by weight to 99% by weight, and preferably 70% by weight to 99% by weight. The same applies to tin-alloy foil so that, in tin-alloy foil, the proportion of tin in the alloy is usually 50% by weight to 99% by weight, and preferably 70% by weight to 99% by weight. Any aluminum alloy can be used insofar as it is alloy of aluminum and another metal (s), and melts at temperatures favorable for the use of the heat-resistant label 2. As with in the case of aluminum alloys, any tin alloy can be used insofar as it is alloy of tin and another metal(s), and melts at temperatures favorable for the use of the heat-resistant label 2. The melting temperature can be adjusted by alloying. For example, usable are aluminum alloy foils of aluminum with at least one metal selected from the group consisting of zinc, tin, indium, copper, nickel, and silver. Among these, alloys of aluminum with zinc and alloys of aluminum with tin are preferable.

The adhering metal foil layer is laminated on the support by, for example, a method of adhering the adhering metal foil layer to the support with an adhering layer composed of a resin, etc. There is no limitation to the area of the adhering metal foil layer to be adhered to the support, insofar as the support is attached to an attachment target. The area of the adhering metal foil layer occupies usually 10% to 100%, and preferably 20% to 100%, of the area of the support. The adhering metal foil layer is not limited in shape insofar as the support is adhered to an attachment target. The adhering metal foil layer can be laminated onto the support in such a manner as to cover the entire surface thereof. Alternatively, an adhering metal foil layer with a round shape, rectangular shape, etc. can be laminated onto the center of the support so as to occupy about 50% of the area of the support. When the support is square, adhering metal foil layers with a round shape, rectangular shape, etc. with an area occupying about 10% of the area of the support can be successively placed at the four corners of the support.

Through such an adhering layer, the adhering metal foil is adhered to the support. Any adhering layer may be used without limitation insofar as the adhering metal foil is adhered to the support, until the adhering metal foil melts and adheres to the support and target. In general, examples of an adhesive forming the adhering layer include: polyolefin-based resins such as polyethylene (e.g., low-density and high-density polyethylenes), polypropylene, polybutene, polyisobutylene, isobutylene maleic anhydride copolymers, polyvinyl acetate, polypropylene chloride, polyvinylidene chloride, polyvinyl ether, etc.; acrylate-based resins such as polymethylmethacrylate, polyacrylic acid, polymethacrylate, polyacrylamide, etc.; polyester-based resins such as polyethylene terephthalate, polybutylene terephthalate, polyethylene naphthalate, polycyclohexane dimethyleneterephthalate, etc.; petroleum-based resins such as polycyclopentadiene, etc.; silicone-based resins such as straight silicone resins, silicone adhesives, modified silicone resins, etc.; phenol-based resins such as 100% phenol resin, novolak-type phenol resins, resol-type phenol resins, etc.; modified alkyd resins such as rosin-modified alkyd resins, phenol-modified alkyd resins, styrene alkyd resins, silicone-modified alkyd resins, etc. Such resins can be used singly or in combination. If necessary, the resins can be dissolved or dispersed in a solvent. In addition to these resins, metal foils with a low melting point can be used. Resins that evaporate or decompose with heat near the temperature at which the adhering metal foil adheres to the support are preferable as the adhesive constituting the adhering layer. Additives, etc. may be suitably added to the resin adhesives in addition to these adhesives.

It is preferable that the adhering layer has sufficient adhering property so that the adhering metal foil does not peel off the support. In the case of a resin adhesive, the thickness of the layer after the solvent is removed is usually about 0.1 µm to about 50 µm, preferably about 2 µm to about 10 µm. A thin adhering layer is suitable for evaporating and decomposing the resin-adhesive.

The area of the resin adhesive layer is suitably determined so that the adhering ability is retained to avoid the adhering metal foil from peeling off the support as described above. The area is preferably 1% to 100%, and more preferably 1% to 80%, per the area of the adhering metal foil. The adhering metal foil layer directly contacts the support at an adhesive-free portion, if any is present, between the support and the adhering metal foil layer. In this case, the adhering metal foil is likely to melt to adhere to the support under very high temperatures, thereby establishing strong adhesion between the label and the attachment target. For example, a label with an adhering layer which is formed in, for example, a spiral pattern can be firmly adhered to an attachment target.

The adhering metal foil may be adhered to the support using the resin adhesive as follows: the above-mentioned adhesive (to which a solvent is added, as needed) is applied to the support, followed by drying, and then the adhering metal foil may be adhered to the support; or the adhesive is applied to the adhering metal foil, followed by drying, and then the support may be adhered thereto. These methods are preferable in that the solvent in the adhesives is easily removed by drying. Alternatively, the following processes may be employed: the adhesive is applied to the support, and then the adhering metal foil is adhered to the support with the adhesive, followed by drying; or the adhesive is applied to the adhering metal foil, and then the support may be adhered to the adhering metal foil with the adhesive, followed by drying. Also, usable is a process comprising: sandwiching a resin film between the support and the adhering metal foil, and then compressing the same while heating at a temperature at which the resin is adhered.

Methods for applying the adhesive to the support and adhering metal foil are not limited, and in general printing methods such as screen-printing, etc.; roll coater methods, gravure roll coater methods, doctor blade methods, bar coater methods, etc. are usable. The adhesive is dried until the solvent is substantially removed, and the drying temperature, drying period, etc. can suitably vary according to the adhesive used.

A metal foil with a low melting point may be used as the adhesive by sandwiching the metal foil between the support and the adhering metal foil to form a laminate, and heating the laminate at a temperature at which the metal sandwiched melts.

The heat-resistant label 2 of the invention has an adhering metal foil layer on an adhering side of the support, and can be provided with a heat-resistant label base layer on the other side (display side). Any films obtained by drying a conventionally used or reported composition for forming the label base, such as a composition comprising a silicone resin, inorganic powder, organic solvent, etc., can be used as the label base layer insofar as the label base layer can withstand a temperature favorable for the use of the heat-resistant label 2 (about 670° C. to about 1100° C.). A cured coating film obtained by drying the composition of the invention can be used at 1100° C., and thus is preferable as a label base layer. In this case, the label base layer can be formed by applying the composition of the invention to the display side of the support, and heating the applied composition to form a cured coating film at a temperature at which the solvent in the composition is substantially removed and the resin in the composition is cross-linked. The label base layer is applied to the support in the same manner as in the heat-resistant label 1.

After applying the composition of the invention to the support, the applied composition is cured by heating. The heating temperature and period are appropriately varied according to the thickness and solvent content of the coating film obtained by applying the composition of the invention to the support, and the material and thickness of the support. For example, heating may be carried out with a convection oven at about 245 to about 500° C., preferably at about 250 to about 400° C. for about 1 minute to about 40 minutes, preferably about 2 minutes to about 20 minutes. The drying period can be suitably adjusted according to the flow of hot air. The thickness of the label base layer after drying is generally about 0.5 µm to about 100 µm, preferably about 1 µm to about 60 µm.

The label base layer may be formed on a support before the adhesive layer or adhering metal foil layer is laminated thereon, or may be formed on a support after the adhesive layer or adhering metal foil layer has been laminated thereon.

The heat-resistant labels 1 and 2 have the following points in common. The use of a colored label base layer (e.g., a label base layer comprising inorganic colored powder) permits product management by color classification of the products, if such product management is desired, which eliminates the necessity of having an identification part. However, for more precise product management, it is preferable to provide an identification part on the label base layer. Providing an identification part allows the heat-resistant label to be used as a data carrier. Thus, various information can be given to a product by attaching the label provided with an identification part to the product. When the heat-resistant label 1 or 2 is provided with no label base layer, the identification part is provided on the display side of the support.

The identification part is usually formed by printing patterns or images, such as characters or symbols (bar codes, etc.), onto the label base layer using known heat-resistant inks. Labels provided with such identification parts can be used as data carrier labels, typified by bar-code labels. Examples of identification parts include any identification codes such as 1-dimensional bar-codes -of the UPC, JAN/EAN (JIS-X-0501, ISO/IEC15420), CODE39 (JIS-X-0503, ISO/IEC15388), CODE128 (JIS-X-0504, ISO/IEC15417), ITF (Interleaved 2 of 5) (JIS-X-0502, ISO/IEC15390), NW-7 (Codabar) (JIS-X-0510), and RSS 14 (UCC/EAN) codes; 2-dimensional codes of the QR (JIS-X-0510, ISO/IEC18004), Micro QR codes, PDF417 (ISO/IEC15438), DataMatrix (ISO/IEC16022), MaxiCode (ISO/IEC16023), AztecCode (ISS1997), and UCC/EAN composite (USS/EAN, ITS1999); and characters. Among these, 1-dimensional and 2-dimensional bar codes are preferable.

Inks capable of withstanding a high-temperature process, i.e., 300° C. or higher, is used as the above-mentioned heat-resistant ink. Heat-resistant inks containing carbon, a metal oxide, etc. as a color pigment are particularly preferable. Examples of metal oxides for use in the heat-resistant inks include oxides of metals such as iron, cobalt, nickel, chromium, copper, manganese, titanium, aluminum, etc. These can be used singly or mixtures thereof. These metal oxides are supplied in the form of a powder, and the particle size is usually about 0.01 µm to about 50 µm, preferably about 0.1 µm to about 10 µm.

Heat-resistant inks containing color pigments can be produced by mixing a binder in an amount of about 1 to about 1000 parts by weight, preferably about 10 to about 200 parts by weight, per 100 parts by weight of the color pigment; adding a solvent as needed; and dispersing or kneading the mixture with a dispersion machine, such as a disper, ball mill, roll mill, sand mill, etc., giving a liquid-like or paste-like mixture. Examples of the binder for use in the process are resins, waxes, fats, oils, low-melting glasses (e.g., glass frits such as borosilicate glass, soda glass, etc.), etc. Among these, a heat-resistant ink containing a color pigment, glass frit, and organic binder is preferable.

Examples of such resins include silicone resins, hydrocarbon resins, vinyl resins, acetal resins, imido resins, amide resins, acrylate resins, polyester resins, polyurethane resins, alkyd resins, protein resins, cellulose resins, etc. For example, organo polysiloxanes, polymetallocarbosilanes, polystyrene, polyethylene, polypropylene, polyvinyl acetate, polyvinyl butyral, polyvinyl formal, polyimides, polyamides, poly(meth)acrylates, gelatin, cellulose derivatives, polyvinyl alcohol, polyvinylpyrrolidone, etc.-are mentioned. These can be used singly or as mixtures or copolymers thereof.

Examples of waxes include paraffin waxes, natural waxes, higher alcohol waxes, higher amide waxes, higher fatty acids, ester waxes, etc. The following examples may be mentioned: paraffin wax, polyethylene wax, yellow wax, carnauba wax, stearyl alcohol, palmityl alcohol, oleyl alcohol, stearamide, oleamide, palmitamide, ethylenebisstearamide, stearic acid, oleic acid, palmitic acid, myristic acid, ethyl stearate, butyl palmitate, palmityl stearate, stearyl stearate, etc.

Examples of fats and oils are castor oil, soybean oil, linseed oil, olive oil, beef tallow, lard, mineral oils, etc. Examples of low-melting glasses include glasses with melting points of 700° C. or lower, glasses soluble in solvents, and more specifically, a glass frit with the melting point of 700° C. or lower and with the particle size of about 0.1 µm to about 100 µm, preferably about 0.2 µm to about 50 µm, water glasses, etc.

The following examples may be mentioned as solvents for use in the process of dispersion or kneading: aliphatic hydrocarbons such as hexane, octane, decane, cyclohexane, etc.; aromatic hydrocarbons such as benzene, toluene, xylene, cumene, naphthalene, etc.; ketones such as acetone, methyl ethyl ketone, cyclohexanone, etc.; alcohols such as methanol, ethanol, 2-ethylhexanol, etc.; ethers such as ethylene glycol monomethyl ether, diethylene glycol dibutyl ether, etc.; esters such as methyl acetate, ethyl formate, ethyl acetoacetate, etc.; petroleum distillation fractions such as gasoline, kerosene, gas oil, etc.; water; etc. It is preferable to use such solvents for dilution in an amount of about 500 parts by weight or less, preferably about 200 parts by weight or less, per 100 parts by weight of the total amount of the color pigment and binder.

Any patterns, including characters and symbols such as a bar code, may be formed on the heat-resistant label of the invention using the heat-resistant ink composed of such components by known printing methods, laser marking, etc. Examples of printing methods include gravure offset printing, plate offset printing, letterpress printing, intaglio printing, silk screen printing, ink-jet printing, ribbon printing, etc. These printing methods and laser markings may be applied not only when providing the identification part on the label base layer, but also when providing the identification marker directly onto the support.

There is no limitation to the shape of the heat-resistant label of the invention, and a shape suitable for a label attaching machine for attaching the label under high temperature conditions is preferable. The heat-resistant label of the invention can be produced by providing other components (the label base layer, sticking layer, adhering layer, adhering metal foil layer, identification part, etc.) to the support which is formed into a shape suitable for attachment to a product, or by producing a large-scale sheet-like support provided with other components, and then forming the same into a shape suitable for attachment to a product. The forming methods are not limited, and include slit processing, punch processing, etc.

There is no limitation to the label attaching machine for attachment of the heat-resistant label of the invention, and any machine can be used insofar as it can withstand high temperatures. In general, textiles showing little distortion when exposed to high temperatures (preferably, textiles woven in three dimensions) are used for the label-contacting area of the head of the label attaching machine. Examples of fibers for such textiles include Tyranno fiber, carbon fiber, glass fiber, alumina silica fiber, etc., and these can be used singly or in combination. Among these, Tyranno fiber is preferable.

When the label is attached to an uneven surface, the following property for the uneven surface is important for the textile for use in the head of the label attaching machine. More specifically, a textile with an excellent following property for the uneven surface increases the label contacting area of the label attachment target, thereby enhancing the label adhesion. Thick textiles made of Tyranno fiber have high elasticity and an excellent following property. Thus, thick textiles made of Tyranno fiber are favorable in view of label adhesiveness.

The inventors conducted cycle tests to evaluate the resistance against heat and pressure of textiles made of Tyranno fiber under the conditions described later, and found that textiles made of Tyranno fiber show excellent resistance against heat and pressure even when they are attached to the product having high temperatures.

Cycle Test for Resistance Against Heat and Pressure

3-D woven Tyranno fiber shaped into a rectangular parallelepiped (vertical×horizontal×height: 80 mm×180 mm×8 mm) was placed in an electric furnace at 600° C., and then the heated fiber was subjected to pressurization (10 seconds, 100 g/cm$^2$), and non-pressurization (6 seconds), together defined as one cycle, and 9000 cycles were repeated. The Tyranno fiber was not deteriorated in appearance, and showed a favorable adhesion property.

Next, the product of the invention is now described. The product of the invention has the heat-resistant label 1 or 2 of the invention attached, and may be either an intermediate product or a finished product. The heat-resistant labels 1 and 2 of the invention can be adhered to heat-resistant products having a temperature of from about 300° C. to about 1100° C. over a short period. The attachment period is usually about 1 second to about 2 minutes, preferably about 1 second to-about 1 minute, and more preferably about 1 second to 30 seconds. Any product can be used insofar as the heat-resistant label of the invention can be attached thereto, and the temperature of the product is within the range of from about 300° C. to about 1100° C. during the product manufacturing process. A heat-resistant label 1 is suitably attached to a product having a temperature in the range from about 300° C. to about 670° C. A heat-resistant label 2 is suitably attached to a product having a temperature in the range of from about 670° C. to about 1100° C., and more preferably about 700° C. to about 1000° C. The product of the invention is usually a metal product, ceramic, glassware, etc. Examples of metal products include primary molded products, such as a metal billets of steel, aluminum, stainless steel, copper, etc., slabs, coils, H-shaped steels, cylindrical tubes, rods, plates, etc., and secondary molded products obtained by molding primary molded products by extrusion molding, casting molding, etc.

BEST MODE FOR CARRYING OUT THE INVENTION

The present invention is now described below in detail with reference to the following Examples but is not limited thereto; Materials used in Experiments and Comparative Experiments are as follows.

<Support>
Aluminum foil: "1N-30-H-40RT",
40 µm thick,
produced by Nippon Foil Mfg. Co., Ltd.
Stainless-steel foil: "SUS304 H-TA/MW",
20 µm thick,
produced by Nippon Steel CORP.

<Polymetallocarbosilane Resin>
"Tyranno coat VS-100"
(containing about 49% by weight of polymetallocarbosilane resin),
produced by Ube Industries, Ltd.
"Tyranno coat VN-100"
(containing about 50% by weight of polymetallocarbosilane resin and silicone resin),
produced by Ube Industries, Ltd.

<Silicone Resin>
"KR255"
(containing about 50% by weight of straight silicone resin),
produced by Shin-Etsu Chemical Co., Ltd.
"TSR116"
(containing about 50% by weight of straight silicone resin),
produced by GE Toshiba Silicones,
"KR3701"
(containing about 60% by weight of silicone adhesive),
produced by Shin-Etsu Chemical Co., Ltd.
"ES-1002T"
(containing about 50% by weight of epoxy-modified straight silicone resin),
produced by Shin-Etsu Chemical Co., Ltd.

<Inorganic Powder>
"KR-380"
(rutile type titanium oxide),
produced by Titan Kogyo K.K.
"TRNS OXIDE RED AA2005"
($Fe_2O_3$),
produced by Dainichiseika Color & Chemicals Mfg. Co., Ltd.
"BI kaolin"
(kaolin),
produced by Maruo Calcium Co., Ltd.
Zinc powder
(zinc),
produced by Mizusawa Kagaku Yakuhin K.K.
"AT-Sn. No. 600"
(tin),
produced by YAMAISHIMETALS.CO.LTD.
"AC-2500"
(aluminum),
produced by TOYO ALUMINIUM K.K.

Note: In addition to the above, commercially available inorganic powders are used.

<Dispersant>
"Disparlon DA705",
produced by Kusumoto Chemicals, Ltd.

<Heat-Resistant Ink>
"HP-350A",
produced by General Corporation.

<Aluminum Foil Layer>
Aluminum foil: "1N-30-H-40RT",
40 µm thick,
produced by Nippon Foil Mfg. Co., Ltd.

<Adhering Layer>
Polyisobutylene resin:
"Tetrax 4T",
produced by Nippon Oil Corporation.

<Release Sheet>
"PET-50x1SS-4B" (fluoride film),
produced by Nippa corporation

Rubbing tests were conducted by rubbing an sticking layer or a label base layer at a pressure of 0.5 to 1 kg/cm$^2$ using 3 to 5 pieces of gauze soaked in xylene. In the rubbing test, when the layer was removed by 5 or 6 rubbings and adhered to the gauze, the layer was defined as a hardened, and when the layer was not removed by 15 rubbings and had barely adhered to gauze, the layer was defined as a cured.

EXAMPLE 1

Heat-resistant Label 1-1

20 parts by weight of Tyranno coat VS-100 as a polymetallocarbosilane resin, 60 parts by weight of KR-380 as inorganic powder, 0.5 parts by weight of Disparon DA705 as a dispersant, and 5 parts by weight of xylene as organic solvent were kneaded. Thereafter, the resultant mixture was dispersed at 3000 rpm for 1 hour using a bead mill dispersion machine ("LMZ-2", manufactured by Ashizawa Finetech Ltd. After confirming the mean particle diameter was 5 µm or less by a grind gauge, a dispersion mill base M-1 was obtained.

20 g of KR255 as a silicone resin was added to 85.5 g of the dispersion mill base M-1, and subsequently 5 g of xylene was added thereto, followed by kneading. Further, xylene was added to the resultant mixture so as to adjust the viscosity to be 25 to 30 seconds/25° C. by viscometer using an I.H.S consistency cup (manufactured by Anest Iwata, to form a coating composition. Subsequently, the coat solution was applied to one side of a 40 μm thick aluminum foil using a bar coater so that the dry film thickness was 15 μm, and dried for 10 minutes at 250° C. using a convection oven (ASSF-114S, manufactured by Isuzu Seisakusho Co., Ltd.), and then allowed to stand at room temperature. After confirming the resultant coating film was cured by the rubbing test, a support provided with a label base layer was obtained.

In the next process, the coating composition was applied to the other side of the support (i.e., the sticking layer side) with a bar coater so that the dry film thickness was 40 pun, dried at 200° C. for 5 minutes using a convection oven (ASSF-114S, manufactured by Isuzu Seisakusho Co., Ltd.), and then allowed to stand at room temperature. After confirming the resultant coating film was hardened by the rubbing test, the coating film was cut into 5 cm×3 cm pieces, giving heat-resistant labels.

EXAMPLE 2 TO 14

Heat-resistant Labels 1-1

Heat-resistant labels were prepared using the components and under the drying conditions shown in Tables 1 to 3 in the same manner as in Example 1. In Examples 10 to 12, dispersion was conducted at 3000 rpm for 3 hours, and not 1 hour using a bead mill dispersion machine. In Example 13, a hardened coating film (sticking layer) only was formed onto one side of the support, and no cured coating film (label base layer) was formed.

COMPARATIVE EXAMPLES 1 TO 3

Labels provided with a sticking layer were obtained using the components and under the drying conditions shown in Table 4 in the same manner as in Example 1.

TABLE 1

| | | Ex. 1 | Ex. 2 | Ex. 3 | Ex. 4 | Ex. 5 |
|---|---|---|---|---|---|---|
| Composition of the label 1 base layer | TYRANNO COAT VS-100 | 20 | 30 | 30 | 20 | 20 |
| | TYRANNO COAT VN-100 | — | — | — | — | — |
| | KR255 | 20 | 30 | — | — | 10 |
| | TSR116 | — | — | 30 | 20 | 10 |
| | KR-380 | 60 | 30 | 30 | 60 | 60 |
| | TRNS OXIDE RED AA2005 | — | — | — | — | — |
| | DA705 | 0.5 | 0.5 | 0.5 | 0.5 | 0.5 |
| | XYLENE | 10 | 7 | 13 | 10 | 10 |
| Drying condition for the label base layer | | 250° C. for 10 minutes | | | | |
| Composition of the sticking layer | | same as the label base layer | | | | |
| Drying condition for the sticking layer | | at 200° C. for 5 minutes | | | | |

TABLE 2

| | | Ex. 6 | Ex. 7 | Ex. 8 | Ex. 9 | Ex. 10 |
|---|---|---|---|---|---|---|
| Composition of the label 1 base layer | TYRANNO COAT VS-100 | — | — | — | — | — |
| | TYRANNO COAT VN-100 | 40 | 40 | 30 | 30 | 30 |
| | KR255 | — | — | 10 | 10 | 10 |
| | TSR116 | — | — | — | 10 | 10 |
| | KR-380 | 20 | 60 | 60 | 60 | — |
| | TRNS OXIDE RED AA2005 | — | — | — | — | 60 |
| | DA705 | 0.5 | 0.5 | 0.5 | 0.5 | 0.5 |
| | XYLENE | 10 | 10 | 10 | 10 | 10 |
| Drying condition for the label base layer | | 250° C. for 10 minutes | | | | |
| Composition of the sticking layer | | same as the label base layer | | | | same as the label base layer of Ex. 1 |
| Drying condition for the sticking layer | | 200° C. for 5 minutes | | | | |

TABLE 3

| | | Ex. 11 | Ex. 12 | Ex. 13 | Ex. 14 |
|---|---|---|---|---|---|
| Composition of the label 1 base layer | TYRANNO COAT VS-100 | — | — | — | 20 |
| | TYRANNO COAT VN-100 | 60 | 30 | — | — |
| | KR255 | 20 | 10 | — | 20 |
| | TSR116 | 20 | 10 | — | — |
| | KR-380 | — | 30 | — | — |
| | BI kaolin | — | — | — | 60 |
| | TRNS OXIDE RED AA2005 | 60 | 30 | — | — |
| | DA705 | 0.5 | 0.5 | — | 0.5 |
| | XYLENE | 10 | 10 | — | 10 |
| Drying condition for the label base layer | | 250° C. for 10 minutes | | | |
| Composition of the sticking layer | | same as the label base layer of Ex. 6 | same as the label base layer of Ex. 10 | same as the label base layer of Ex. 10 | same as the label base layer of Ex. 1 |
| Drying condition for the sticking layer | | 200° C. for 5 minutes | | | |

TABLE 4

|  |  | Com. Ex. 1 | Com. Ex. 2 | Com. Ex. 3 |
|---|---|---|---|---|
| Composition of the sticking layer | TYRANNO COAT VS-100 | — | — | — |
|  | TYRANNO COAT VN-100 | — | — | — |
|  | KR255 | 60 | 40 | — |
|  | TSR116 | — | — | 60 |
|  | KR-380 | 30 | 60 | 30 |
|  | TRNS OXIDE RED AA2005 | — | — | — |
|  | DA705 | 0.5 | 0.5 | 0.5 |
|  | XYLENE | 1 | 10 | 13 |
| Drying condition for the sticking layer | | 150° C. for 5 minutes | | |
| Composition of the label 1 base layer | | same as the label base layer of Ex. 1 | | |
| Drying condition for the label base layer | | 250° C. for 10 minutes | | |

TEST EXAMPLE 1

The following tests were conducted using the labels obtained in the above-mentioned Examples 1 to 14 and Comparative Examples 1 to 3. The results are shown in Tables 5 and 6. In addition to these test results, it was found that a barcode was clearly printed on the label base layer of Example 14. A label with a barcode printed was attached to a product under the same conditions as in the label attachment tests 1, 2, and 3, and the printed barcode state was found to be distinct without being peeled off by the label attaching machine, and was favorably readout by a barcode reader.

High Temperature Label Attachment Test 1:

Each label was compressed to an aluminum billet at a side with a surface temperature of 500° C. at a pressure of 50 g/cm² for 5 seconds using a manually-operated label attaching machine. Thereafter, the aluminum billet was allowed to cool to room temperature, and was observed for label attachment state, appearance and scratch resistance. The appearance and scratch resistance of the label of Example 13 were not evaluated since it was not provided with a label base layer. The results are shown in Table 5.

The label adhesion was evaluated according to the following criteria:

A: The label is not peeled off; and
C: The label is peeled off.

The criteria for evaluating the appearance were as follows:

C: The label base layer is partially peeled off the support; and
A: No change observed.

The scratch resistance was evaluated by scratching the label base layer 2 or 3 times at a speed of 5 cm/second using a coin while applying a load of about 500 g to the coin, and the evaluation criteria were as follows:

C: The label base layer crumbled and peeled off the support; and
A: The label base layer is not scratched or the surface of the layer is slightly peeled off.

High Temperature Label Attachment Test 2:

Evaluations were conducted in the same manner as in the high temperature label attachment test 1 except that the surface temperature of the label attaching target (aluminum billet) is 600° C. The results are shown in Table 5.

High Temperature Label Attachment Test 3:

Evaluations were conducted in the same manner as in the high temperature label attachment test 1 except that the surface temperature of the label attachment target (iron billet) is 660° C. The results are shown in Table 6.

TABLE 5

|  | Attachment test 1 500° C. | | | Attachment test 2 600° C. | | |
|---|---|---|---|---|---|---|
|  | Adhesion | Appearance | Scratch resistance | Adhesion | Appearance | Scratch resistance |
| Ex. 1 | A | A | A | A | A | A |
| Ex. 2 | A | A | A | A | A | A |
| Ex. 3 | A | A | A | A | A | A |
| Ex. 4 | A | A | A | A | A | A |
| Ex. 5 | A | A | A | A | A | A |
| Ex. 6 | A | A | A | A | A | A |
| Ex. 7 | A | A | A | A | A | A |
| Ex. 8 | A | A | A | A | A | A |
| Ex. 9 | A | A | A | A | A | A |
| Ex. 10 | A | A | A | A | A | A |
| Ex. 11 | A | A | A | A | A | A |
| Ex. 12 | A | A | A | A | A | A |
| Ex. 13 | A | — | — | A | — | — |
| Ex. 14 | A | A | A | A | A | A |
| Com. Ex. 1 | C | C | C | C | C | C |
| Com. Ex. 2 | C | C | C | C | C | C |
| Com. Ex. 3 | C | C | C | C | C | C |

TABLE 6

|  | Attachment test 3 660° C. | | |
|---|---|---|---|
|  | Adhesion | Appearance | Scratch resistance |
| Ex. 1 | A | A | A |
| Ex. 2 | A | A | A |
| Ex. 3 | A | A | A |
| Ex. 4 | A | A | A |
| Ex. 5 | A | A | A |
| Ex. 6 | A | A | A |
| Ex. 7 | A | A | A |
| Ex. 8 | A | A | A |
| Ex. 9 | A | A | A |
| Ex. 10 | A | A | A |
| Ex. 11 | A | A | A |
| Ex. 12 | A | A | A |
| Ex. 13 | A | — | — |
| Ex. 14 | A | A | A |
| Com. Ex. 1 | C | C | C |
| Com. Ex. 2 | C | C | C |
| Com. Ex. 3 | C | C | C |

EXAMPLE 15

Heat-resistant Label 2

20 parts by weight of Tyranno coat VS-100 as a polymetallocarbosilane resin, 60 parts by weight of KR-380 as inorganic powder, 0.5 parts by weight of Disparon DA705 as a dispersant, and 5 parts by weight of xylene as organic solvent were kneaded. Thereafter, the resultant mixture was dispersed at 3000 rpm for 1 hour using a bead mill dispersion machine ("LMZ-2", manufactured by Ajisawa Finetech Ltd. After confirming the mean particle diameter was 5 μm or less by a grind gauge, a dispersion mill base M-1 was obtained.

20 g of KR255 as a silicone resin was added to 85.5 g of the dispersion mill base M-1, and subsequently 5 g of xylene was added thereto, followed by kneading. Further, xylene was added to the resultant mixture so as to adjust the viscosity to be 25 to 30 seconds/25° C. by viscosity measurement using an I. H. S consistency cup (manufactured by Anest Iwata), to form a coating composition. Subsequently, the coating composition was applied with a bar coater to one side of a stainless steel foil 20 μm thick so that the dry film thickness was 15 μm, and dried for 10 minutes at 250° C. using a convection oven (ASSF-114S, manufactured by Isuzu Seisakusho Co., Ltd.), and then allowed to cool to room temperature. After confirming that the resultant coating film was cured by the rubbing test, a support provided with a label base layer was obtained.

In the next process, Tetrax 4T was applied as an adhesive with a bar coater to one entire side of an aluminum foil 40 μm thick so that the dry film thickness was 8 μm, and dried at 100° C. for 5 minutes using a convection oven (ASSF-114S, manufactured by Isuzu Seisakusho Co., Ltd.), and was allowed to cool to room temperature, giving an aluminum foil layer provided with an adhering layer.

The obtained support with the label base layer, and aluminum foil with the adhering layer, were pasted together. The obtained laminated sheet was cut into 5 cm×3 cm pieces, giving heat-resistant labels.

EXAMPLES 16 TO 27

Heat-resistant Labels 2

Heat-resistant labels were obtained using the compositions and under the drying conditions shown in Tables 7 to 9 in the same manner as in Example 15. In Examples 24 to 26, dispersion using a bead mill dispersion machine was conducted at 3000 rpm for 3 hours, and not 1 hour. In Example 27, only an aluminum foil was formed onto one side of the support with an adhering layer, and a cured coating film (i.e., label base layer) was not formed.

TABLE 7

| | | Ex. 15 | Ex. 16 | Ex. 17 | Ex. 18 | Ex. 19 |
|---|---|---|---|---|---|---|
| Composition of the label base layer | TYRANNO COAT VS-100 | 20 | 30 | 30 | 20 | 20 |
| | TYRANNO COAT VN-100 | — | — | — | — | — |
| | KR255 | 20 | 30 | — | — | 10 |
| | TSR116 | — | — | 30 | 20 | 10 |
| | KR-380 | 60 | 30 | 30 | 60 | 60 |
| | TRNS OXIDE RED AA2005 | — | — | — | — | — |
| | DA705 | 0.5 | 0.5 | 0.5 | 0.5 | 0.5 |
| | XYLENE | 10 | 7 | 13 | 10 | 10 |
| Drying condition of the label base layer | | \multicolumn{5}{c}{250° C. for 10 minutes} |
| Structure of the adhering layer | | \multicolumn{5}{c}{adhering layer and aluminum foil} |

TABLE 8

| | | Ex. 20 | Ex. 21 | Ex. 22 | Ex. 23 | Ex. 24 |
|---|---|---|---|---|---|---|
| Composition of the label base layer | TYRANNO COAT VS-100 | — | — | — | — | — |
| | TYRANNO COAT VN-100 | 40 | 40 | 30 | 30 | 30 |
| | KR255 | — | — | 10 | 10 | 10 |
| | TSR116 | — | — | — | 10 | 10 |
| | KR-380 | 20 | 60 | 60 | 60 | — |
| | TRNS OXIDE RED AA2005 | — | — | — | — | 60 |
| | DA705 | 0.5 | 0.5 | 0.5 | 0.5 | 0.5 |
| | XYLENE | 10 | 10 | 10 | 10 | 10 |
| Drying condition of the label base layer | | \multicolumn{5}{c}{250° C. for 10 minutes} |
| Structure of the adhering layer | | \multicolumn{5}{c}{adhering layer and aluminum foil} |

TABLE 9

| | | Ex. 25 | Ex. 26 | Ex. 27 |
|---|---|---|---|---|
| Composition of the label base layer | TYRANNO COAT VS-100 | — | — | — |
| | TYRANNO COAT VN-100 | 60 | 30 | — |
| | KR255 | 20 | 10 | — |
| | TSR116 | 20 | 10 | — |
| | KR-380 | — | 30 | — |
| | TRNS OXIDE RED AA2005 | 60 | 30 | — |
| | DA705 | 0.5 | 0.5 | — |
| | XYLENE | 10 | 10 | — |
| Drying condition of the label base layer | | 250° C. for 10 minutes | | — |
| Structure of the adhering layer | | adhering layer and aluminum foil | | |

EXAMPLES 28 TO 39

Heat-resistant Labels 2

Heat-resistant labels were obtained in the same manner as in Example 15 except that the adhesive was applied in stripe-like patterns to one side of the aluminum foil using the compositions and under the dry conditions shown in Tables 10 to 12. The adhesive application method was as follows.

Adhesive applied areas of 5 mm width and non-adhesive applied areas of 10 mm width were sequentially provided on one side of the aluminum foil using a barcoater with the adhesive being applied in stripes at an angle of 45° in a spiral manner.

In Examples 36 to 38, dispersion using a bead mill dispersion machine was conducted at 3000 rpm for 3 hours, and not 1 hour. In Example 39, only an aluminum foil was formed onto one side of the support with an adhering layer, and a cured coating film (i.e., label base layer) was not formed.

TABLE 10

|  |  | Ex. 28 | Ex. 29 | Ex. 30 | Ex. 31 |
|---|---|---|---|---|---|
| Composition of the label base layer | TYRANNO COAT VS-100 | 30 | 30 | 20 | 20 |
|  | TYRANNO COAT VN-100 | — | — | — | — |
|  | KR255 | 30 | — | — | 10 |
|  | TSR116 | — | 30 | 20 | 10 |
|  | KR-380 | 30 | 30 | 60 | 60 |
|  | TRNS OXIDE RED AA2005 | — | — | — | — |
|  | DA705 | 0.5 | 0.5 | 0.5 | 0.5 |
|  | XYLENE | 7 | 13 | 10 | 10 |
| Drying condition of the label base layer |  | 250° C. for 10 minutes | | | |
| Structure of the adhering layer |  | adhering layer and aluminum foil | | | |

TABLE 11

|  |  | Ex. 32 | Ex. 33 | Ex. 34 | Ex. 35 | Ex. 36 |
|---|---|---|---|---|---|---|
| Composition of the label base layer | TYRANNO COAT VS-100 | — | — | — | — | — |
|  | TYRANNO COAT VN-100 | 40 | 40 | 30 | 30 | 30 |
|  | KR255 | — | — | 10 | 10 | 10 |
|  | TSR116 | — | — | — | 10 | 10 |
|  | KR-380 | 20 | 60 | 60 | 60 | — |
|  | TRNS OXIDE RED AA2005 | — | — | — | — | 60 |
|  | DA705 | 0.5 | 0.5 | 0.5 | 0.5 | 0.5 |
|  | XYLENE | 10 | 10 | 10 | 10 | 10 |
| Drying condition of the label base layer |  | 250° C. for 10 minutes | | | | |
| Structure of the adhering layer |  | adhering layer and aluminum foil | | | | |

TABLE 12

|  |  | Ex. 37 | Ex. 38 | Ex. 39 |
|---|---|---|---|---|
| Composition of the label base layer | TYRANNO COAT VS-100 | — | — | — |
|  | TYRANNO COAT VN-100 | 60 | 30 | — |
|  | KR255 | 20 | 10 | — |
|  | TSR116 | 20 | 10 | —s |
|  | KR-380 | — | 30 | — |
|  | TRNS OXIDE RED AA2005 | 60 | 30 | — |
|  | DA705 | 0.5 | 0.5 | — |
|  | XYLENE | 10 | 10 | — |
| Drying condition of the label base layer |  | 250° C. for 10 minutes | | |
| Structure of the adhering layer |  | adhering layer and aluminum foil | | |

TEST EXAMPLE 2

The following tests were conducted using the labels obtained in the above Examples 15 to 39 and Comparative Examples 1 to 3.

High Temperature Label Attachment Test 4:

Testing was conducted in the same manner as in the high temperature label attachment test 1 except that the surface temperature of the label attachment target (iron billet) was 680° C. The appearance was evaluated and those labels showing slight cracking were rated as "B". The results are shown in Table 13.

High Temperature Label Attachment Test 5:

Testing was conducted in the same manner as in the high temperature label attachment test 1 except that the surface temperature of the label attachment target (iron billet) was 700° C. The label of Example 1 was not evaluated. The results are shown in Table 13.

High Temperature Label Attachment Test 6:

Testing was conducted in the same manner as in the high temperature label attachment test 1 except that the surface temperature of the label attachment target (iron billet) was 1000° C. The label of Example 1 was not evaluated. The results are shown in Table 14.

TABLE 13

| | Attachment test 4 680° C. | | | Attachment test 5 700° C. | | |
|---|---|---|---|---|---|---|
| | Adhesion | Appearance | Scratch resistance | Adhesion | Appearance | Scratch resistance |
| Ex. 1 | A | B | A | — | — | — |
| Ex. 15 | A | A | A | A | A | A |
| Ex. 16 | A | A | A | A | A | A |
| Ex. 17 | A | A | A | A | A | A |
| Ex. 18 | A | A | A | A | A | A |
| Ex. 19 | A | A | A | A | A | A |
| Ex. 20 | A | A | A | A | A | A |
| Ex. 21 | A | A | A | A | A | A |
| Ex. 22 | A | A | A | A | A | A |
| Ex. 23 | A | A | A | A | A | A |
| Ex. 24 | A | A | A | A | A | A |
| Ex. 25 | A | A | A | A | A | A |
| Ex. 26 | A | A | A | A | A | A |
| Ex. 27 | A | — | — | A | — | — |
| Ex. 28 | A | A | A | A | A | A |
| Ex. 29 | A | A | A | A | A | A |
| Ex. 30 | A | A | A | A | A | A |
| Ex. 31 | A | A | A | A | A | A |
| Ex. 32 | A | A | A | A | A | A |
| Ex. 33 | A | A | A | A | A | A |
| Ex. 34 | A | A | A | A | A | A |
| Ex. 35 | A | A | A | A | A | A |
| Ex. 36 | A | A | A | A | A | A |
| Ex. 37 | A | A | A | A | A | A |
| Ex. 38 | A | A | A | A | A | A |
| Ex. 39 | A | — | — | A | — | — |
| Com. Ex. 1 | C | C | C | C | C | C |
| Com. Ex. 2 | C | C | C | C | C | C |
| Com. Ex. 3 | C | C | C | C | C | C |

TABLE 14

| | Attachment test 6 1000° C. | | |
|---|---|---|---|
| | Adhesion | Appearance | Scratch resistance |
| Ex. 15 | A | A | A |
| Ex. 16 | A | A | A |
| Ex. 17 | A | A | A |
| Ex. 18 | A | A | A |
| Ex. 19 | A | A | A |
| Ex. 20 | A | A | A |
| Ex. 21 | A | A | A |
| Ex. 22 | A | A | A |
| Ex. 23 | A | A | A |
| Ex. 24 | A | A | A |
| Ex. 25 | A | A | A |
| Ex. 26 | A | A | A |
| Ex. 27 | A | — | — |
| Ex. 28 | A | A | A |
| Ex. 29 | A | A | A |
| Ex. 30 | A | A | A |
| Ex. 31 | A | A | A |
| Ex. 32 | A | A | A |
| Ex. 33 | A | A | A |
| Ex. 34 | A | A | A |
| Ex. 35 | A | A | A |
| Ex. 36 | A | A | A |
| Ex. 37 | A | A | A |
| Ex. 38 | A | A | A |
| Ex. 39 | A | — | — |
| Com. Ex. 1 | C | C | C |
| Com. Ex. 2 | C | C | C |
| Com. Ex. 3 | C | C | C |

EXAMPLES 40 AND 41

Heat-resistant Labels 1-1 and Comparative Examples 4 AND 5

Heat-resistant labels were prepared in a similar manner as in Example 1 except that the thickness after drying of the coating film of the adhering layers was 30 μm, and drying conditions were: room temperature for 10 minutes (Comparative Example 4), 100° C. for 5 minutes 10 (Example 40), 200° C. for 5 minutes (Example 41), and 300° C. for 5 minutes (Comparative Example 5).

Each label was placed on the top surface of an aluminum billet having a surface temperature of 500° C. and pressed thereto at a pressure of 50 g/cm² for 5 seconds. The aluminum billet after pressing was cooled to room temperature. The ignition, appearance and adhesion of each label were examined.

As for the ignition of the labels, those that did not ignite were graded "A" and those that ignited were graded "C". As for the appearance of the labels, those that did not scorch were graded "A" and those that scorched were graded "C". As for the adhesion of the labels, those that securely adhered to the billet without loosening were graded "A" and those that loosened or peeled off from the billet were graded "C". The results-.are presented in Table 15.

TABLE 15

| | Drying condition | Thickness of Coating film | Ignition | Appearance | Adhesion |
|---|---|---|---|---|---|
| Comp. Ex. 4 | Room temperature for 10 min | 30 μm | C | C | A |
| Ex. 40 | 100° C. for 5 min | 30 μm | A | A | A |
| Ex. 41 | 200° C. for 5 min | 30 μm | A | A | A |
| Comp. Ex. 5 | 300° C. for 5 min | 30 μm | A | A | C |

The label of Comparative Example 4 having a large solvent content ignited at 500° C. The label of Comparative Example 5 whose sticking layer was comprised of a coating film that had been cured rather than hardened did not adhere.

EXAMPLES 42

Heat-resistant Label 1-2

A label base layer was created in a similar manner as in Example 1 on one side of an aluminum foil having a thickness of 40 μm.

20 parts by weight of KR3701 as a silicone resin, 36 parts by weight of zinc powder as an inorganic powder, 0.3 parts by weight of Disparon DA705 as a dispersant, and 20 parts by weight of xylene as an organic solvent were kneaded. Thereafter, the resultant mixture was dispersed using a bead mill dispersion machine as described previously at 3000 rpm for 1 hour. After confirming the mean particle diameter was 5 μm or less by a grind gauge, a dispersion mill base M-2 was obtained. 4 g of KR3701 was added to 76.3 g of the dispersion mill base M-2, and subsequently 10 g of xylene was added thereto, followed by kneading. Xylene was further added to the resultant mixture so as to adjust the viscosity to be 55 to 60 seconds/25° C. by a viscometer using an I•H•S consistency cup, to form a coating composition. Subsequently, the coating composition was applied to the other side of the support using a bar coater such that the dry film thickness was 40 μm, and dried at 200° C. for 5 minutes using a convection oven (ASSF-114S, manufactured by Isuzu Seisakusho Co., Ltd.) to remove the solvent contained in the coating film, and then allowed to stand at room temperature. The surface of the sticking layer of the resulting sheet was laminated with a release sheet coated with fluoro resin, and a 5 cm×3 cm piece was cut from the laminated sheet, thereby giving a heat-resistant label. When this label was stuck to an article, the release sheet was removed and then-the surface of the sticking layer was attached to an article.

EXAMPLES 43 TO 47

Heat-resistant Labels 1-2

Heat-resistant labels were prepared using the compositions presented in Table 16 in a similar manner as in Example 42.

TABLE 16

| | Ex. 42 | Ex. 43 | Ex. 44 | Ex. 45 | Ex. 46 | Ex. 47 |
|---|---|---|---|---|---|---|
| Composition of label base layer | same as the label base layer of Ex. 1 | | | | | |
| Drying condition for label base layer | 250° C. for 10 minutes | | | | | |

TABLE 16-continued

|  |  | Ex. 42 | Ex. 43 | Ex. 44 | Ex. 45 | Ex. 46 | Ex. 47 |
|---|---|---|---|---|---|---|---|
| Composition of sticking layer | KR3701 | 24 | 40 | 24 | 40 | 24 | 40 |
|  | Zinc powder | 36 | 36 | — | — | — | — |
|  | Tin powder | — | — | 36 | 36 | — | — |
|  | Al powder | — | — | — | — | 36 | 36 |
|  | DA705 | 0.3 | 0.3 | 0.3 | 0.3 | 0.3 | 0.3 |
|  | Xylene | 30 | 40 | 30 | 40 | 30 | 40 |
| Drying condition for sticking layer | | 200° C. for 5 minutes | | | | | |

EXAMPLES 48 TO 53

Heat-resistant Labels 1-2

Heat-resistant labels were prepared using the compositions shown in Table 17 in a similar manner as in Example 42 except that KR255 was used as a silicone resin. No release sheet was used since it was unnecessary.

TABLE 17

|  |  | Ex. 48 | Ex. 49 | Ex. 50 | Ex. 51 | Ex. 52 | Ex. 53 |
|---|---|---|---|---|---|---|---|
| Composition of label base layer | | same as the label base layer of Ex. 1 | | | | | |
| Drying condition for label base layer | | 250° C. for 10 minutes | | | | | |
| Composition of sticking layer | KR255 | 24 | 40 | 24 | 40 | 24 | 40 |
|  | Zinc powder | 30 | 30 | — | — | — | — |
|  | Tin powder | — | — | 30 | 30 | — | — |
|  | Al powder | — | — | — | — | 30 | 30 |
|  | DA705 | 0.3 | 0.3 | 0.3 | 0.3 | 0.3 | 0.3 |
|  | Xylene | 30 | 40 | 30 | 40 | 30 | 40 |
| Drying condition for sticking layer | | 200° C. for 5 minutes | | | | | |

EXAMPLES 54 TO 59

Heat-resistant-labels 1-2

Heat-resistant labels were prepared using the compositions shown in Table 18 in a similar manner as in Example 42 except that ES-1002T was used as a silicone resin. No release sheet was used since it was unnecessary.

TABLE 18

|  |  | Ex. 54 | Ex. 55 | Ex. 56 | Ex. 57 | Ex. 58 | Ex. 59 |
|---|---|---|---|---|---|---|---|
| Composition of label base layer | | same as the label base layer of Ex. 1 | | | | | |
| Drying condition for label base layer | | 250° C. for 10 minutes | | | | | |
| Composition of sticking layer | ES-1002T | 24 | 40 | 24 | 40 | 24 | 40 |
|  | Zinc powder | 30 | 30 | — | — | — | — |
|  | Tin powder | — | — | 30 | 30 | — | — |
|  | Al powder | — | — | — | — | 30 | 30 |

TABLE 18-continued

|  |  | Ex. 54 | Ex. 55 | Ex. 56 | Ex. 57 | Ex. 58 | Ex. 59 |
|---|---|---|---|---|---|---|---|
|  | DA705 | 0.3 | 0.3 | 0.3 | 0.3 | 0.3 | 0.3 |
|  | Xylene | 8 | 12 | 8 | 12 | 8 | 12 |
| Drying condition for sticking layer | | 200° C. for 5 minutes | | | | | |

COMPARATIVE EXAMPLES 6 TO 8

Heat-resistant labels were prepared using the compositions shown in Table 19 in a similar manner as in Example 42 except that no inorganic powder was used. A release sheet was used only for the label of Comparative Example 6 in which silicone adhesive KR3701 was used.

TABLE 19

|  |  | Comp. Ex. 6 | Comp. Ex. 7 | Comp. Ex. 8 |
|---|---|---|---|---|
| Composition of label base layer | | same as the label base layer of Ex. 1 | | |
| Drying condition for label base layer | | 250° C. for 10 minutes | | |
| Composition of sticking layer | KR3701 | 50 | — | — |
|  | KR255 | — | 50 | — |
|  | ES-1002T | — | — | 50 |
|  | DA705 | — | — | — |
|  | Xylene | 10 | 10 | 10 |
| Drying condition for sticking layer | | 200° C. for 5 minutes | | |

EXAMPLES 9 TO 17

Heat-resistant labels were prepared using the compositions shown in Tables 20 and 21 in a similar manner as in Example 42 except that inorganic powders other than powders of zinc, tin and aluminum were used.

TABLE 20

|  |  | Comp. Ex. 9 | Comp. Ex. 10 | Comp. Ex. 11 | Comp. Ex. 12 | Comp. Ex. 13 |
|---|---|---|---|---|---|---|
| Composition of label base layer | | same as the label base layer of Ex. 1 | | | | |
| Drying condition for label base layer | | 250° C. for 10 minutes | | | | |
| Composition of sticking layer | KR3701 | 24 | 24 | 24 | 24 | 24 |
|  | Thallium powder | 36 | — | — | — | — |
|  | Kaolin powder | — | 36 | — | — | — |
|  | Bismuth powder | — | — | 36 | — | — |
|  | Iron powder | — | — | — | 36 | — |
|  | Selenium powder | — | — | — | — | 36 |
|  | DA705 | 0.3 | 0.3 | 0.3 | 0.3 | 0.3 |
|  | Xylene | 30 | 30 | 30 | 30 | 30 |
| Drying condition for sticking layer | | 200° C. for 5 minutes | | | | |

TABLE 21

|  | Comp. Ex. 14 | Comp. Ex. 15 | Comp. Ex. 16 | Comp. Ex. 17 |
|---|---|---|---|---|
| Composition of label base layer | same as the label base layer of Ex. 1 | | | |
| Drying condition for label base layer | 250° C. for 10 minutes | | | |
| Composition of sticking layer  KR3701 | 24 | 24 | 24 | 24 |
| Tellurium powder | 36 | — | — | — |
| Indium powder | — | 36 | — | — |
| Magnesium powder | — | — | 36 | — |
| Antimony powder | — | — | — | 36 |
| DA705 | 0.3 | 0.3 | 0.3 | 0.3 |
| Xylene | 30 | 30 | 30 | 30 |
| Drying condition for sticking layer | 200° C. for 5 minutes | | | |

TEST EXAMPLE 3

High-temperature label attachment tests 1 to 3 were performed using the labels obtained in Examples 42 to 59 and Comparative Examples 6 to 17 in a similar manner as in Test Example 1 except that the labels were left to stand for 4 hours at the same temperature as their application. The results are presented in Tables 22 and 23.

TABLE 22

|  | Attachment test 1 500° C. | | | Attachment test 2 600° C. | | |
|---|---|---|---|---|---|---|
|  | Adhesion | Appearance | Scratch resistance | Adhesion | Appearance | Scratch resistance |
| Ex. 42 | A | A | A | A | A | A |
| Ex. 43 | A | A | A | A | A | A |
| Ex. 44 | A | A | A | A | A | A |
| Ex. 45 | A | A | A | A | A | A |
| Ex. 46 | A | A | A | A | A | A |
| Ex. 47 | A | A | A | A | A | A |
| Ex. 48 | A | A | A | A | A | A |
| Ex. 49 | A | A | A | A | A | A |
| Ex. 50 | A | A | A | A | A | A |
| Ex. 51 | A | A | A | A | A | A |
| Ex. 52 | A | A | A | A | A | A |
| Ex. 53 | A | A | A | A | A | A |
| Ex. 54 | A | A | A | A | A | A |
| Ex. 56 | A | A | A | A | A | A |
| Ex. 57 | A | A | A | A | A | A |
| Ex. 58 | A | A | A | A | A | A |
| Ex. 59 | A | A | A | A | A | A |
| Comp. Ex. 4 | C | C | A | C | C | A |
| Comp. Ex. 5 | C | C | A | C | C | A |
| Comp. Ex. 6 | C | C | A | C | C | A |
| Comp. Ex. 7 | C | C | A | C | C | A |
| Comp. Ex. 8 | C | C | A | C | C | A |
| Comp. Ex. 9 | C | C | A | C | C | A |
| Comp. Ex. 10 | C | C | A | C | C | A |
| Comp. Ex. 11 | C | C | A | C | C | A |
| Comp. Ex. 12 | C | C | A | C | C | A |
| Comp. Ex. 13 | C | C | A | C | C | A |
| Comp. Ex. 14 | C | C | A | C | C | A |
| Comp. Ex. 15 | C | C | A | C | C | A |
| Comp. Ex. 16 | C | C | A | C | C | A |
| Comp. Ex. 17 | C | C | A | C | C | A |

TABLE 23

|  | Attachment test 3 660° C. | | |
|---|---|---|---|
|  | Adhesion | Appearance | Scratch resistance |
| Ex. 42 | A | A | A |
| Ex. 43 | A | A | A |
| Ex. 44 | A | A | A |
| Ex. 45 | A | A | A |
| Ex. 46 | A | A | A |
| Ex. 47 | A | A | A |
| Ex. 48 | A | A | A |
| Ex. 49 | A | A | A |
| Ex. 50 | A | A | A |
| Ex. 51 | A | A | A |
| Ex. 52 | A | A | A |
| Ex. 53 | A | A | A |
| Ex. 54 | A | A | A |
| Ex. 56 | A | A | A |
| Ex. 57 | A | A | A |
| Ex. 58 | A | A | A |
| Ex. 59 | A | A | A |
| Comp. Ex. 4 | C | C | A |
| Comp. Ex. 5 | C | C | A |
| Comp. Ex. 6 | C | C | A |
| Comp. Ex. 7 | C | C | A |
| Comp. Ex. 8 | C | C | A |
| Comp. Ex. 9 | C | C | A |
| Comp. Ex. 10 | C | C | A |
| Comp. Ex. 11 | C | C | A |
| Comp. Ex. 12 | C | C | A |
| Comp. Ex. 13 | C | C | A |
| Comp. Ex. 14 | C | C | A |
| Comp. Ex. 15 | C | C | A |
| Comp. Ex. 16 | C | C | A |
| Comp. Ex. 17 | C | C | A |

INDUSTRIAL APPLICABILITY

The label of the invention is heat-resistant, and thus can be attached to a heat-resistant product having high temperatures during a high-temperature treatment or immediately after the treatment. Therefore, product management using the heat-resistant label with barcodes, etc. can be conducted at an earlier stage. Moreover, the present invention can eliminate the necessity of a cooling period, cooling energy, and a cooling place which are required for cooling the heat-resistant products such as metal products, etc. to room temperature so as to attach conventional labels thereon. For example, in production of a stainless steel billet, the heat-resistant label 2 can be attached to a stainless steel billet having a temperature of about 1100° C. During production of an aluminum billet, the heat-resistant label 1 can be attached to the aluminum billet having a temperature of about 650° C. immediately after manufacturing.

The label of the present invention can be used for controlling distribution and sales as in conventional bar-code labels, etc., unless the label is not taken off after attachment. In the invention, a product represents not only commercial products after manufacturing but also raw materials, intermediate products, etc. during the production process.

The invention claimed is:

1. A heat-resistant label for metal attachment, the heat-resistant label comprising:
    a label base layer, a support, and a sticking layer, which are laminated in this order, wherein:
        the label base layer is a cured coating film obtained by applying to a display side of the support a composition for a label base layer and heating the composition, the composition comprising a reactive silicone resin (A), a polymetallocarbosilane resin (B-1), and a solvent (C), and the weight ratio of the reactive silicone resin (A) to the polymetallocarbosilane resin (B-1) being about 1:9 to about 9:1,
        the support is a metal foil, and
        the sticking layer comprises a hardened coating film comprising a reactive silicone resin (A) and at least one member selected from the group consisting of a polymetallocarbosilane resin, zinc powder, tin powder, and aluminum powder (B), wherein the polymetallocarbosilane resin comprises at least one metal selected from the group consisting of titanium, zirconium, molybdenum, and chromium.

2. The heat-resistant label according to claim 1, wherein the weight ratio of the reactive silicone resin (A) to the polymetallocarbosilane resin (B-1) in the composition for a label base layer is about 7:3 to about 2:8.

3. The heat-resistant label according to claim 1, wherein the composition for a label base layer further comprises an inorganic filler (D).

4. The heat-resistant label according to claim 1, wherein in the composition for a label base layer, the polymetallocarbosilane resin (B-1) is at least one member selected from the group consisting of polytitanocarbosilane resins and polyzirconocarbosilane resins.

5. The heat-resistant label according to claim 1, wherein the sticking layer is a hardened coating film obtained by applying to the support a composition for a sticking layer and evaporating off the solvent contained in the composition, the composition comprising a reactive silicone resin (A), at least one member selected from the group consisting of a polymetallocarbosilane resin, zinc powder, tin powder, and aluminum powder (B), and a solvent (C).

6. The heat-resistant label according to claim 5, wherein the composition for a sticking layer further comprises an inorganic filler (D).

7. The heat-resistant label according to claim 5, wherein in the composition for a sticking layer, the polymetallocarbosilane resin is at least one member selected from the group consisting of polytitanocarbosilane resins and polyzirconocarbosilane resins.

8. The heat-resistant label according to claim 5, wherein the composition for a sticking layer comprises a silicone resin (A), at least one high-temperature-adhering inorganic powder selected from the group consisting of zinc powder, tin powder, and aluminum powder (B-2), and a solvent (C).

9. The heat-resistant label according to claim 1, wherein the hardened coating film comprises a reactive silicone resin (A), a polymetallocarbosilane resin (B-1), and at least one high-temperature-adhering inorganic powder selected from the group consisting of zinc powder, tin powder, and aluminum powder (B-2).

10. The heat-resistant label according to claim 1, wherein the support has a thickness of about 5 μm to about 100 μm.

11. The heat-resistant label according to claim 1, wherein the metal foil is an aluminum foil, stainless steel foil, or copper foil.

12. The heat-resistant label according to claim 1, having an identification part on the label base layer.

13. The heat-resistant label according to claim 1, for use in attachment at temperatures of 300°C. or higher.

14. A method for producing a heat-resistant label for metal attachment, the label comprising a label base layer, a support, and a sticking layer, which are laminated in this order, and the method comprising the steps of:
    applying to a display side of the support a composition for a label base layer, the composition comprising a reactive silicone resin (A), a polymetallocarbosilane resin (B-1), and a solvent (C);
    heating the applied composition for a label base layer to form a cured coating film;
    applying to a sticking side of the support a composition for a sticking layer, the composition comprising a reactive silicone resin (A), at least one member selected from the group consisting of a polymetallocarbosilane resin, zinc powder, tin powder, and aluminum powder (B), and a solvent (C); and
    drying the applied composition for a sticking layer to form a hardened coating film, wherein the polymetallocarbosilane resin comprises at least one metal selected from the group consisting of titanium, zirconium, molybdenum, and chromium.

15. The production method according to claim 14, wherein the applied composition for a sticking layer is dried at about 50°C. to about 240°C.

16. A heat-resistant label for attachment at 670 to 1100°C. comprising a label base layer, a second support, and an adhering metal foil layer, which are laminated in this order, wherein:
    the label base layer comprises a cured coating film obtained by applying to a display side of the support a composition for a label base layer and heating the composition, the composition comprising a reactive silicone resin (A), a polymetallocarbosilane resin (B-1), and a solvent (C), and the weight ratio of the reactive silicone resin (A) to the polymetallocarbosilane resin (B-1) being about 1:9 to about 9:1,
    the support is a metal foil, and
    the adhering metal foil layer is at least one member selected from the group consisting of an aluminum foil, aluminum-alloy foil, tin foil, and tin-alloy foil,
    and wherein:
    the polymetallocarbosilane resin comprises at least one metal selected from the group consisting of titanium, zirconium, molybdenum, and chromium.

17. The heat-resistant label according to claim 16, wherein the adhering metal foil layer is laminated on the support through an adhering layer.

18. The heat-resistant label according to claim 16, wherein the adhering metal foil layer has a thickness of 5 μm to 100 μm.

19. The heat-resistant label according to claim 16, wherein the support is a stainless steel foil, copper foil, or iron foil.

20. The heat-resistant label according to claim 16, wherein the composition for a label base layer further comprises an inorganic filler (D).

21. The heat-resistant label according to claim 16, wherein in the composition for a label base layer, the polymetallocarbosilane resin (B-1) is at least one member selected from the group consisting of polytitanocarbosilane resins and polyzirconocarbosilane resins.

22. The heat-resistant label according to claim 16, comprising an identification part on the label base layer.

* * * * *

UNITED STATES PATENT AND TRADEMARK OFFICE
CERTIFICATE OF CORRECTION

PATENT NO. : 7,659,005 B2  Page 1 of 1
APPLICATION NO. : 10/569836
DATED : February 9, 2010
INVENTOR(S) : Yoshihiro Akamatsu It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 629 days.

Signed and Sealed this

Twenty-eighth Day of December, 2010

David J. Kappos
*Director of the United States Patent and Trademark Office*